(12) United States Patent
Araki

(10) Patent No.: US 10,178,275 B2
(45) Date of Patent: Jan. 8, 2019

(54) INFORMATION PROCESSING SYSTEM, APPARATUS, AND INFORMATION PROCESSING METHOD

(71) Applicant: Ryoji Araki, Fukuoka (JP)

(72) Inventor: Ryoji Araki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/873,980

(22) Filed: Jan. 18, 2018

(65) Prior Publication Data

US 2018/0270392 A1 Sep. 20, 2018

(30) Foreign Application Priority Data

Mar. 16, 2017 (JP) .................................. 2017-051229

(51) Int. Cl.
*G06K 15/00* (2006.01)
*H04N 1/44* (2006.01)
(Continued)

(52) U.S. Cl.
CPC ....... *H04N 1/4413* (2013.01); *H04N 1/00344* (2013.01); *H04N 1/32122* (2013.01);
(Continued)

(58) Field of Classification Search
CPC ............. H04N 1/4413; H04N 1/00344; H04N 1/32122; H04N 2201/0039; H04N 2201/0094; H04N 2201/3205
(Continued)

(56) References Cited

U.S. PATENT DOCUMENTS 8,264,717 B2   9/2012 Araki
8,474,051 B2   6/2013 Araki
(Continued)

FOREIGN PATENT DOCUMENTS

JP   2014-032659   2/2014

OTHER PUBLICATIONS

U.S. Appl. No. 15/073,371, filed Mar. 17, 2016.
U.S. Appl. No. 15/830,354, filed Dec. 4, 2017.
U.S. Appl. No. 15/667,805, filed Aug. 3, 2017.

*Primary Examiner* — Neil R McLean
(74) *Attorney, Agent, or Firm* — IPUSA, PLLC

(57) ABSTRACT

An information processing system includes an apparatus and an information processing apparatus coupled to an external device via a network. The information processing apparatus includes a first transmitting unit configured to perform authentication using authentication information provided by the apparatus, and to transmit first data denoting a completion of the authentication to the apparatus. The apparatus includes a first identifying unit configured to identify user identification information of the operator of the apparatus, and an acquisition unit configured to receive the authentication information from the operator, to obtain the first data from the information processing apparatus by sending the authentication information, and to store the first data with the user identification information into a first storage unit. When the first data correlated with the user identification information has already stored in the first storage unit, the acquisition unit does not request the operator to input the authentication information.

15 Claims, 22 Drawing Sheets

(51) Int. Cl.
*H04N 1/00* (2006.01)
*H04N 1/32* (2006.01)

(52) U.S. Cl.
CPC ............ *H04N 2201/0039* (2013.01); *H04N 2201/0094* (2013.01); *H04N 2201/3205* (2013.01)

(58) Field of Classification Search
USPC ........................................ 358/1.14
See application file for complete search history.

(56) References Cited

U.S. PATENT DOCUMENTS

| | | |
|---|---|---|
| 8,488,135 B2 | 7/2013 | Shimizu et al. |
| 8,767,244 B2 | 7/2014 | Araki |
| 8,773,676 B2 * | 7/2014 | Tsujimoto ......... H04N 1/00244 358/1.13 |
| 8,982,386 B2 | 3/2015 | Araki |
| 9,124,733 B2 | 9/2015 | Ando |
| 9,195,976 B2 | 11/2015 | Araki |
| 9,218,224 B2 | 12/2015 | Araki |
| 9,261,947 B2 | 2/2016 | Araki |
| 9,286,048 B2 | 3/2016 | Araki |
| 9,286,141 B2 | 3/2016 | Araki |
| 9,307,108 B2 | 4/2016 | Araki |
| 9,323,478 B2 | 4/2016 | Araki |
| 9,323,917 B2 | 4/2016 | Araki |
| 9,723,161 B2 | 8/2017 | Araki |
| 9,747,059 B2 | 8/2017 | Araki |
| 9,813,578 B2 | 11/2017 | Araki et al. |
| 2009/0251724 A1 * | 10/2009 | Nakajima ............ G06F 21/608 358/1.15 |
| 2013/0258385 A1 | 10/2013 | Shimizu et al. |
| 2014/0253945 A1 * | 9/2014 | Neville ................ H04L 63/083 358/1.14 |
| 2016/0014113 A1 | 1/2016 | Akiyoshi et al. |
| 2016/0065756 A1 | 3/2016 | Araki et al. |
| 2017/0161048 A1 | 6/2017 | Araki |
| 2017/0293457 A1 | 10/2017 | Araki |

\* cited by examiner

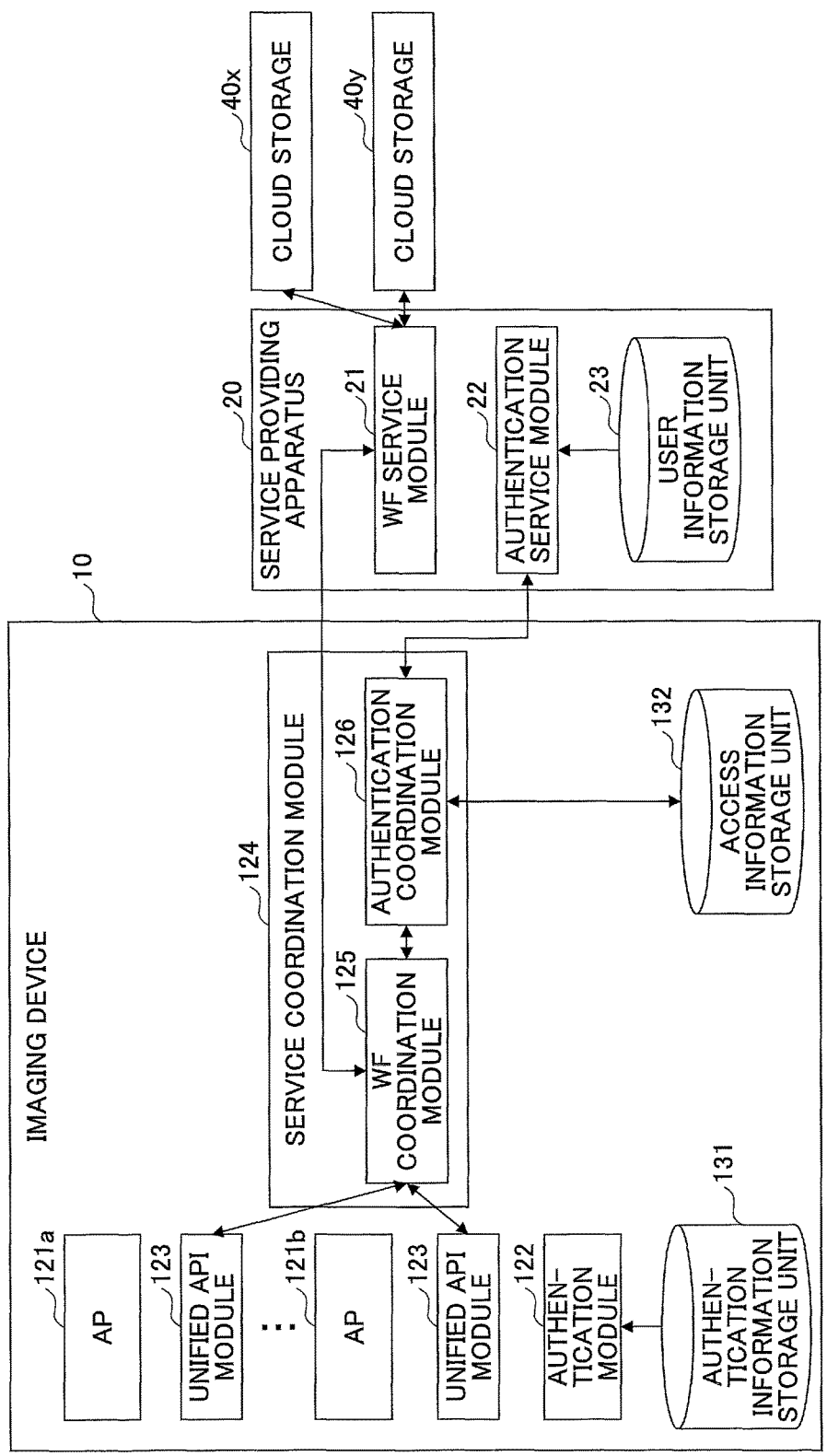

FIG.6

| DUID | DPWD | ... 131 |
|---|---|---|
| duser1 | ... | ... |
| duser2 | ... | ... |
| : | : | : |

FIG.7

| DUID | SUID | LAST AUTHENTICATED DATE | OUID | ATOKEN | EXPIRATION DATE | ALLOW LIST | DENY LIST |
|---|---|---|---|---|---|---|---|
| duser1 | suser1 | ... | 123_duser1_suser1 | atoken1 | 2016/12/01 | app1 | app3 |
|  |  |  |  |  |  | app2 | app4 |
|  | suser1a | ... | 123_duser1_suser1a | atoken2 | 2016/12/03 | app5 | app1 |
|  |  |  |  |  |  | app6 | app2 |
| duser2 | suser2 | ... | 123_duser2_suser2 | atoken3 | 2016/12/03 |  | app1 |
|  |  |  |  |  |  |  | app2 |
|  |  |  |  |  |  |  | app3 |
|  |  |  |  |  |  |  | app4 |
| duser3 | suser3 | ... | iccard1 | atoken4 | 2016/12/31 | app1 |  |
| duser3a | suser3a | ... | iccard2 123_duser2_suser3a | atoken5 | 2016/12/31 | app1 |  |

| SUID | SPWD | ATOKEN | EXPIRATION DATE | EXTERNAL TOKEN | OUID |
|---|---|---|---|---|---|
| suser1 | ... | ... | ... | ... | ... |
| suser1a | ... | ... | ... | ... | 123_duser1_suser1a |
| suser2 | ... | ... | ... | ... | 123_duser2_suser2 |
| suser3 | ... | ... | ... | ... | ... |
| suser3a | ... | ... | ... | ... | 123_duser2_suser3a |

23

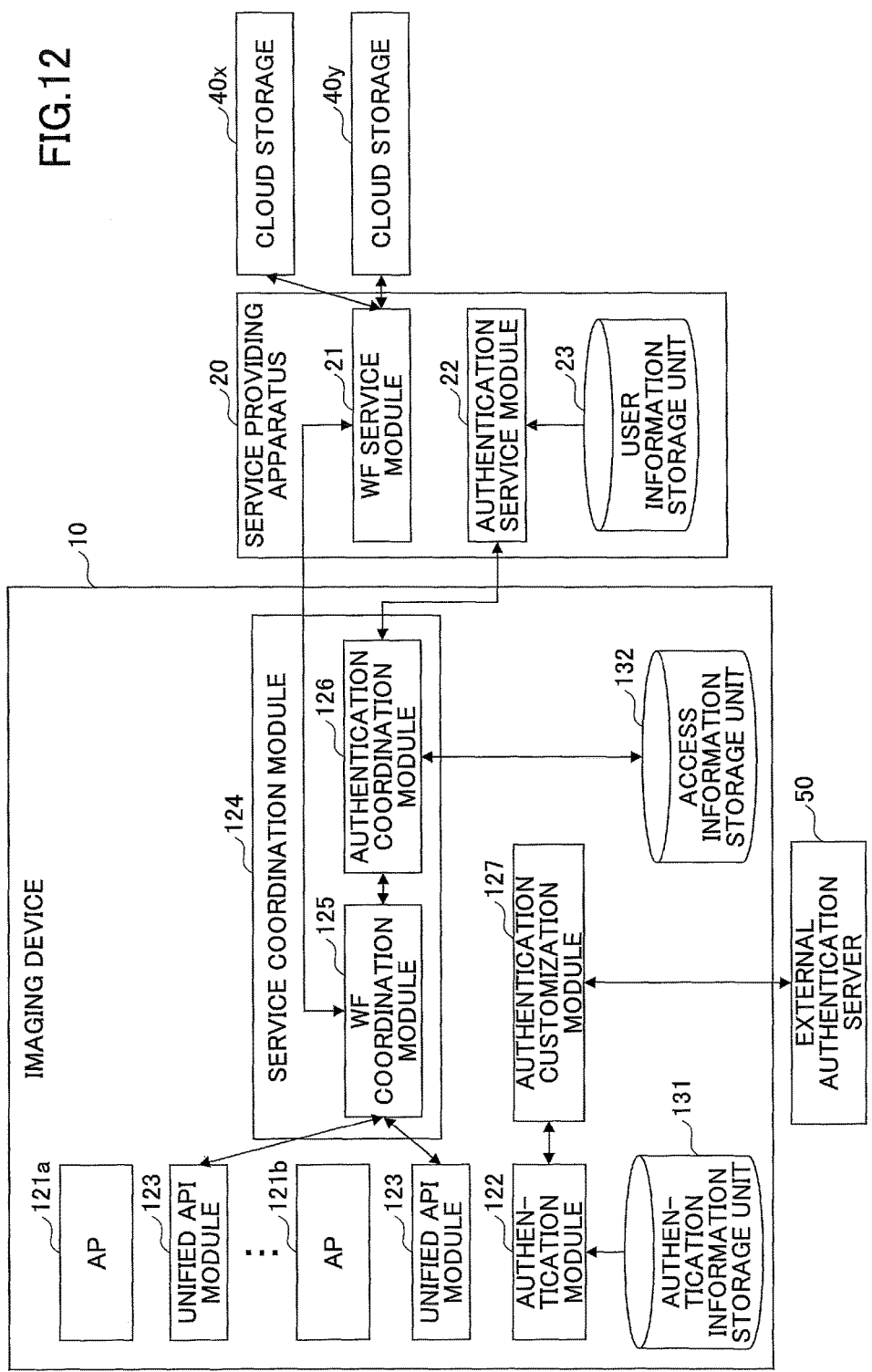

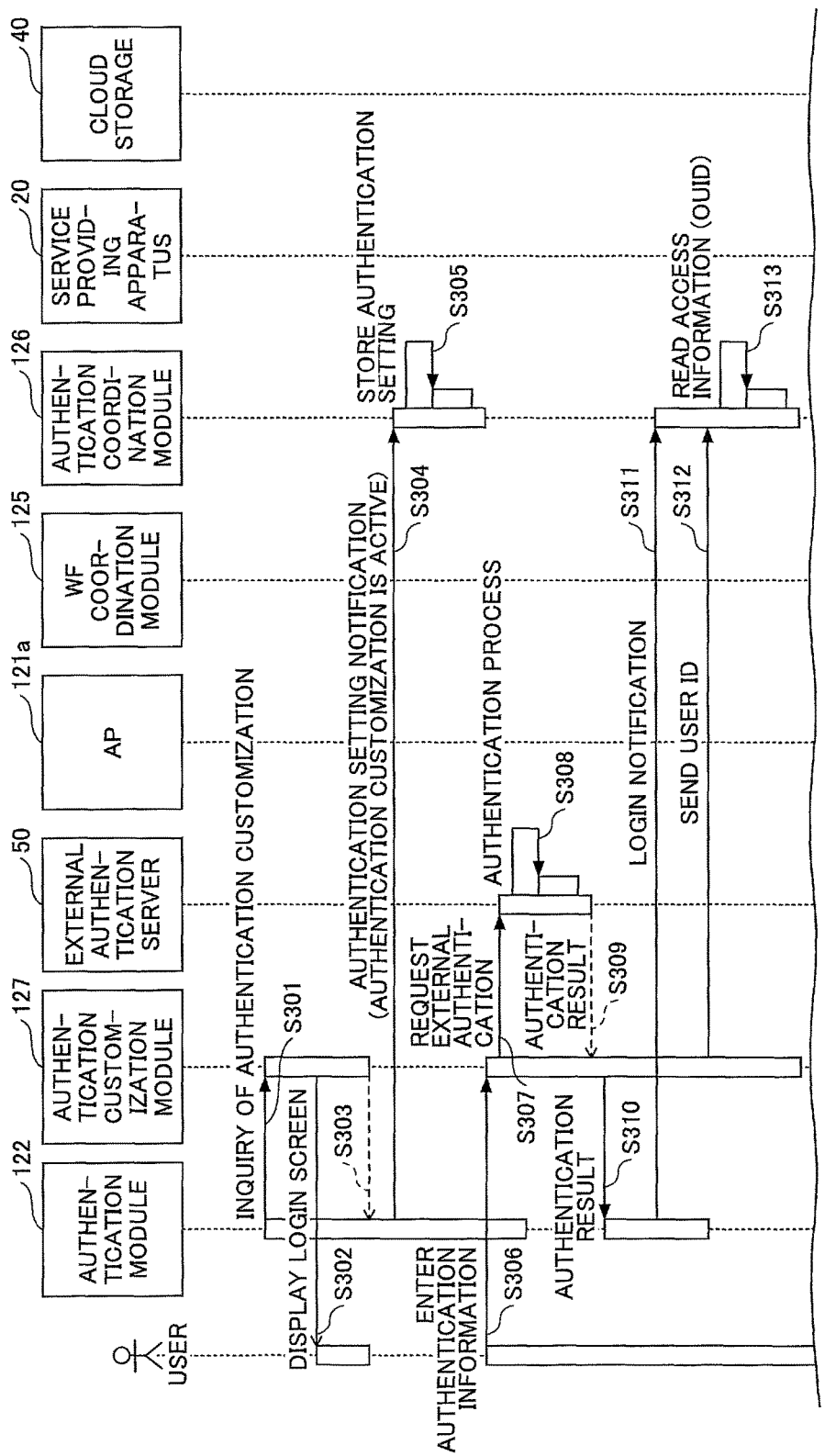

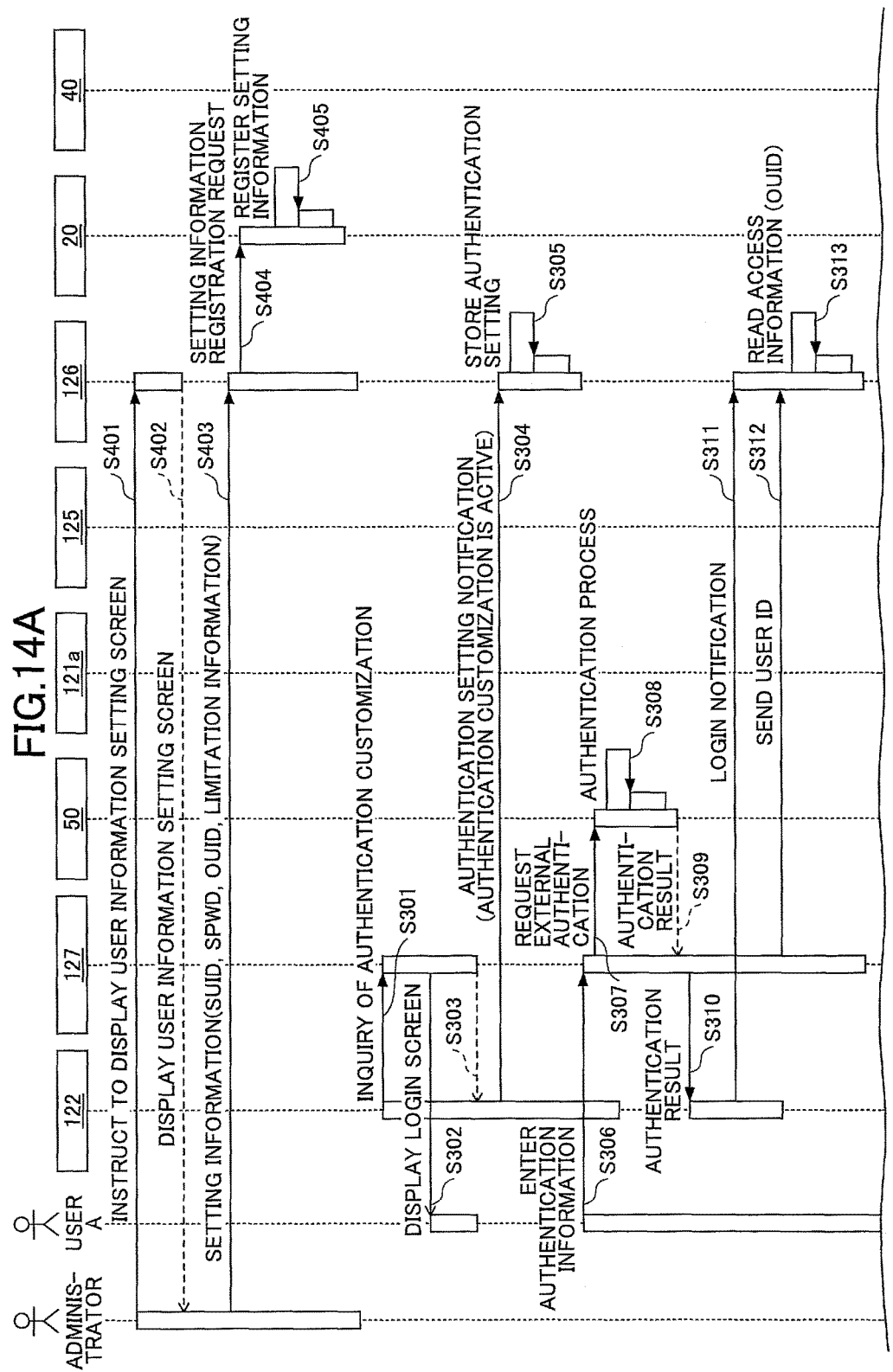

FIG.15

| SUID | SPWD | ATOKEN | EXPIRATION DATE | EXTERNAL TOKEN | OUID | LIMITATION INFORMATION |
|---|---|---|---|---|---|---|
| suser1 | ... | ... | ... | ... | ... | xxx.xxx.xxx.*** |
| suser1a | ... | ... | ... | ... | 123_duser1_suser1a | |
| suser2 | ... | ... | ... | ... | 123_duser2_suser2 | |
| suser3 | ... | ... | ... | ... | ... | |
| suser3a | ... | ... | ... | ... | 123_duser2_suser3a | |

23

INFORMATION PROCESSING SYSTEM, APPARATUS, AND INFORMATION PROCESSING METHOD

CROSS-REFERENCE TO RELATED APPLICATION

The present application claims priority under 35 U.S.C. § 119 to Japanese Patent Application No. 2017-051229, filed on Mar. 16, 2017, the contents of which are incorporated herein by reference in their entirety.

BACKGROUND OF THE INVENTION

1. Field of the Invention

The present disclosure relates to an information processing system, an apparatus, and an information processing method.

2. Description of the Related Art

Some apparatuses, such as an imaging device, have their own application platform. In such apparatuses, an application program (hereinafter referred to as an "AP") developed on the application platform can be installed.

If an AP installed in an apparatus is able to be coordinated with an external service provided via a network such as the Internet (for example, a cloud service, or a network service called ASP (Application Service Provider)), it may be able to provide a new value added function. However, if such an AP is to be provided, some problems may arise.

Some services provided via a network (hereinafter referred to as an "external service") have their own authentication functions to prevent unauthorized accesses. Further, each authentication function implemented in each service may differ. Hence, an AP utilizing multiple external services (for example, an AP using multiple cloud storage) may require a user to input authentication information every time the AP accesses each external service. Because an input of authentication information is a complicated operation for users, an increase of a frequency of authentication information input may become a heavy burden for users.

SUMMARY OF THE INVENTION

To solve the above problem, according to one aspect of the present disclosure, there is provision of an information processing system including an apparatus and an information processing apparatus coupled to an external device via a network. The apparatus is coupled to the information processing apparatus, and includes a first identifying unit and an acquisition unit. The information processing apparatus includes a first transmitting unit configured to perform authentication of an operator of the apparatus using authentication information provided by the operator, and to transmit, to the apparatus, first data denoting that the authentication has been made by the information processing apparatus, in response to success of the authentication. The first identifying unit is configured to identify user identification information of the operator of the apparatus. The acquisition unit is configured, in response to receiving a processing request concerning the external device from the operator, to request the operator to input the authentication information for the information processing apparatus, to send the authentication information input by the operator to the information processing apparatus, to obtain the first data from the information processing apparatus, and to store the first data into a first storage unit by correlating with the user identification information. When the first data correlated with the user identification information identified by the first identifying unit has already been stored in the first storage unit, the acquisition unit does not request the input of the authentication information of the operator.

BRIEF DESCRIPTION OF THE DRAWINGS

FIG. 4 is a diagram illustrating an example of a functional configuration of the information processing system according to the first embodiment;

FIG. 6 is a diagram illustrating an example of a configuration of an authentication information storage unit;

FIG. 7 is a diagram illustrating an example of a configuration of an access information storage unit;

FIG. 9 is a diagram illustrating an example of a configuration of a user information storage unit according to the first embodiment;

FIG. 12 is a diagram illustrating an example of a functional configuration of the information processing system according to the third embodiment;

FIG. 13A is a sequence diagram illustrating an example of a flow of a process performed in the information processing system according to the third embodiment;

FIG. 14A is a sequence diagram illustrating an example of a flow of a process performed in an information processing system according to a fourth embodiment;

FIG. 15 is a diagram illustrating an example of a configuration of a user information storage unit according to the fourth embodiment.

DETAILED DESCRIPTION OF THE
PREFERRED EMBODIMENTS

Figure 1:
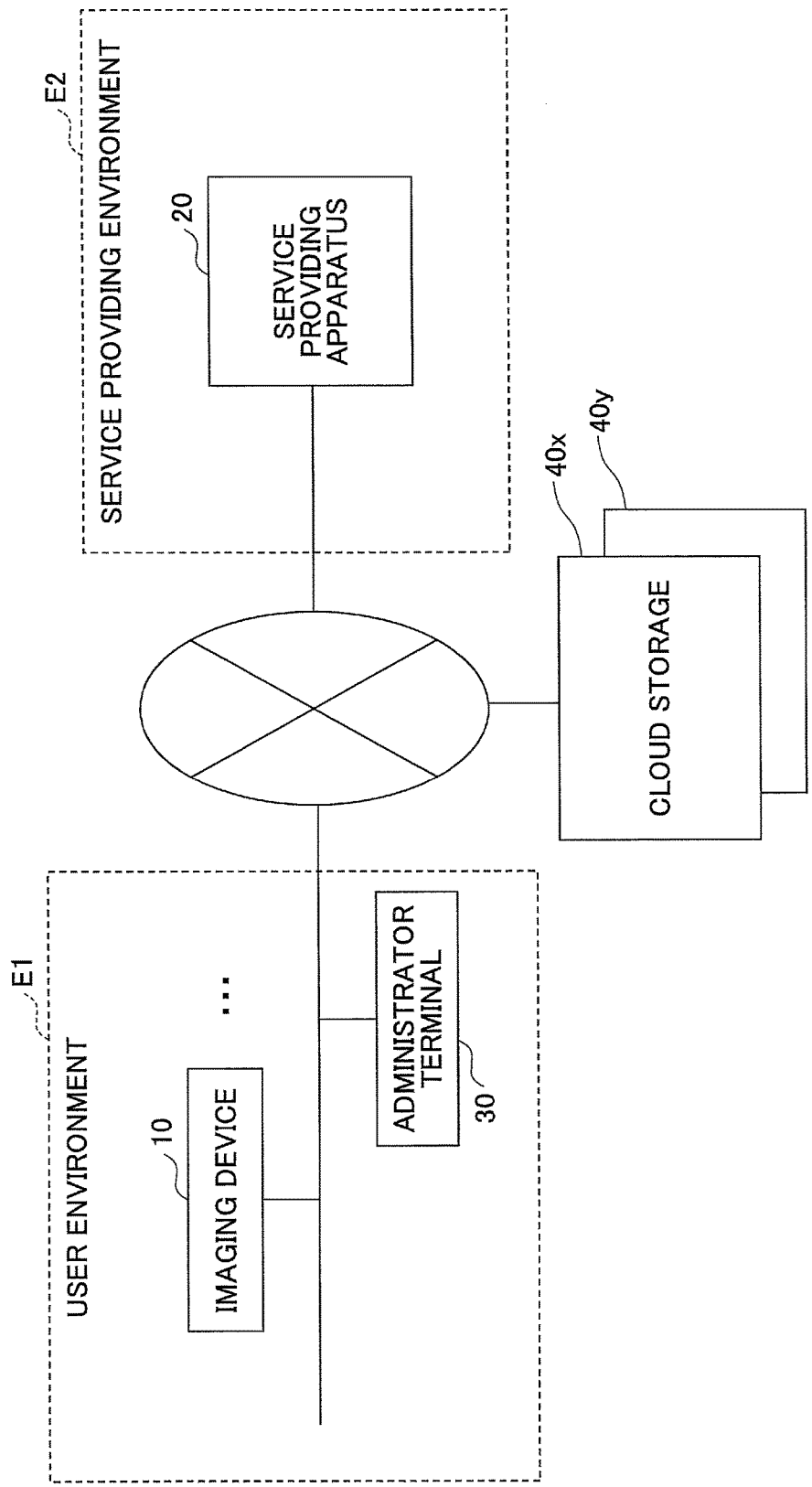
FIG. 1 is a diagram illustrating an example of a configuration of an information processing system according to a first embodiment.

In the following, embodiments of the present disclosure will be described with reference to the drawings. FIG. 1 is a diagram illustrating an example of a configuration of an information processing system according to a first embodiment. In the information processing system 1 illustrated in FIG. 1, a service providing environment E2, a user environment E1, and cloud storage 40x and 40y are connected to each other via a wide area network such as the Internet.

The service providing environment E2 is a system environment owned by an organization to provide a service via a network. The service may be provided as a form of a cloud service, or as other forms such as a service provided by an ASP (Application Service Provider), a Web service, or the like. That is, the service provided by the service providing environment E2 is not limited to a specific form, as long as the service is provided via a network. In the present embodiment, the service providing environment E2 provides a service to facilitate use of the cloud storage 40x, 40y, and the like by an imaging device 10 in the user environment E1.

The service providing environment E2 includes a service providing apparatus 20. The service providing apparatus 20 provides the service mentioned above via a network. For example, the service providing apparatus 20 provides a service to deliver image data scanned by the imaging device 10 to any one of the cloud storage 40. Note that the service providing apparatus 20 may be provided inside the user environment E1. In other words, the service providing apparatus 20 may be included in the user environment E1.

The user environment E1 is a system environment of a user (an organization such as a company) owning the imaging device 10. In the user environment E1, at least one imaging device 10 and an administrator terminal 30 are connected to each other via a network such as a LAN (Local Area Network).

In the present embodiment, the imaging device 10 includes an image scanning function. Alternatively, a multifunction peripheral, which includes a printing function, a copying function, a facsimile function, and the like, in addition to the image scanning function, may be used as the imaging device 10.

The administrator terminal 30 is used by an administrator of the imaging device 10 in the user environment E1. Examples of the administrator terminal 30 include a PC (Personal Computer), a PDA (Personal Digital Assistant), a smartphone, a tablet terminal, a cellular phone, or the like. The smartphone mentioned above typically includes various functions such as an image capturing function by a camera, a Web browsing function such as a PC, and the like, in addition to a call function. Further, the tablet terminal mentioned here is typically a tablet type terminal device which acts as a multifunction terminal.

Each of the cloud storage 40x and 40y (hereinafter, both may be referred to as "cloud storage 40" when distinguishing is unnecessary) is a computing system for providing a service to rent a storage region via a network.

Figure 2:
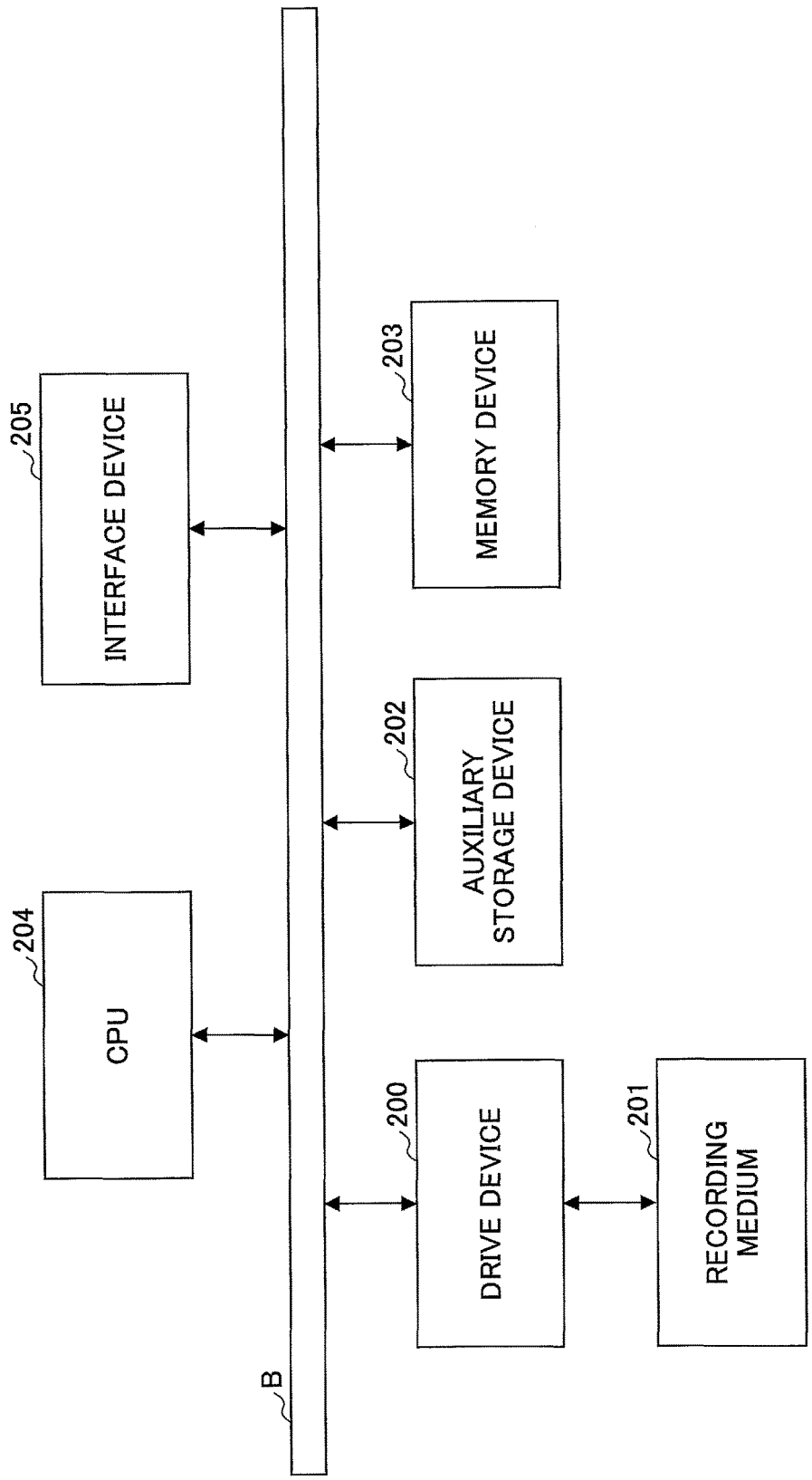
FIG. 2 is a diagram illustrating an example of a hardware configuration of a service providing apparatus according to the first embodiment.

FIG. 2 is a diagram illustrating an example of a hardware configuration of the service providing apparatus 20 according to the first embodiment. The service providing apparatus 20 illustrated in FIG. 2 includes a drive device 200, an auxiliary storage device 202, a memory device 203, a CPU 204, and an interface device 205, which are interconnected via a bus B.

A program, which is executed in the service providing apparatus 20 to cause the service providing apparatus 20 to perform processes, may be installed into the auxiliary storage device 202 from a recording medium 201 such as a CD-ROM in which the program is stored, via the drive device 200, by inserting the recording medium 201 into the drive device. Alternatively, the program may be downloaded from another computer via a network. The auxiliary storage device 202 stores necessary files or data, in addition to the installed program.

When an instruction to start the program is received, the program stored in the auxiliary storage device 202 is loaded into the memory device 203. The CPU 204 performs information processing such as executions of various arithmetic operations or executions of various functions of the service providing apparatus 20 in accordance with the program loaded in the memory device 203. The interface device 205 is an interface for connecting the service providing apparatus 20 to a network.

The service providing apparatus 20 may be configured by multiple computers having hardware architectures illustrated in FIG. 2. In other words, processes performed in the service providing apparatus 20 which will be described later, may be executed across the multiple computers in a distributed manner.

Figure 3:
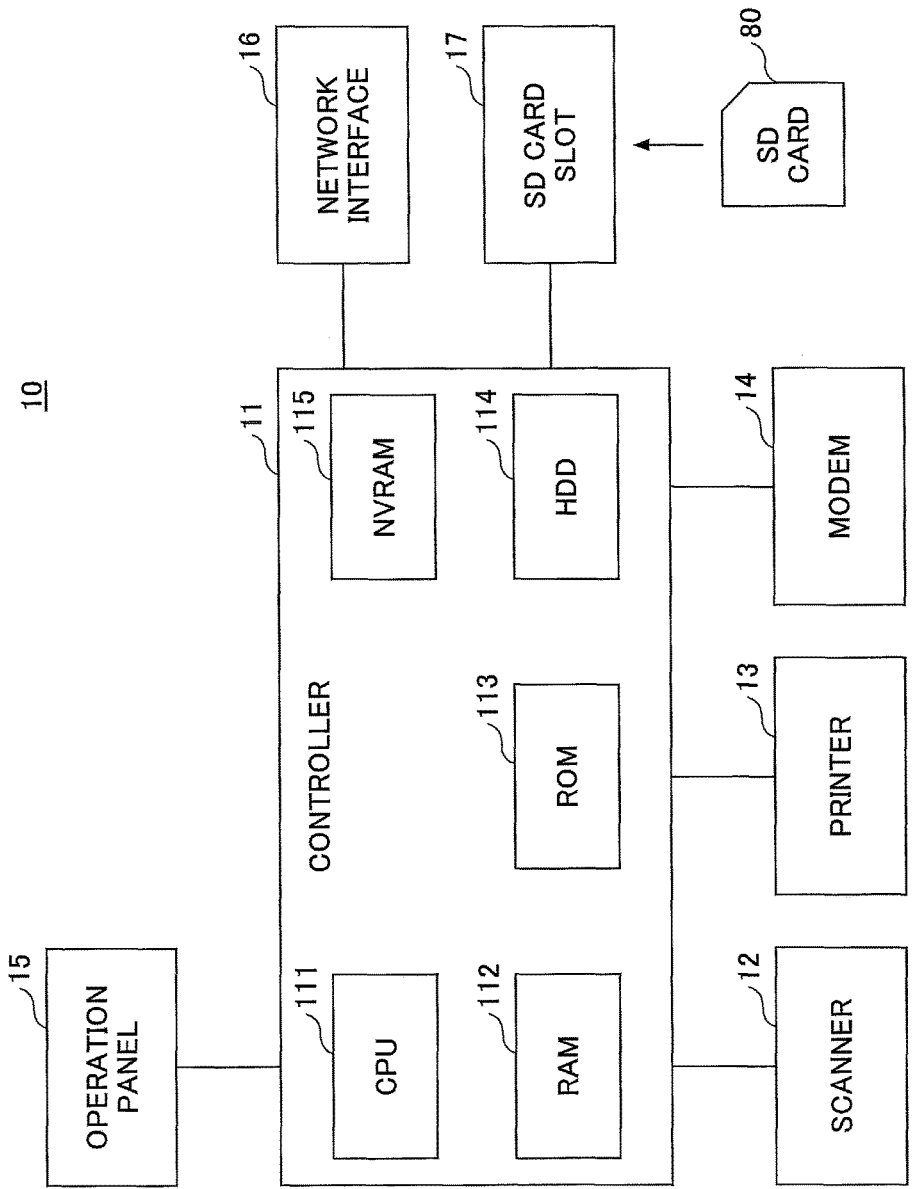
FIG. 3 is a diagram illustrating an example of a hardware configuration of an imaging device according to the first embodiment.

FIG. 3 is a diagram illustrating an example of a hardware configuration of the imaging device 10 according to the first embodiment. The imaging device 10 illustrated in FIG. 3 includes hardware such as a controller 11, a scanner 12, a printer 13, a modem 14, an operation panel 15, a network interface 16, and an SD card slot 17.

The controller 11 includes a CPU 111, a RAM 112, a ROM 113, an HDD 114, an NVRAM 115, and the like. The ROM 113 stores various programs and data used by the programs. The RAM 112 is used as a storage region for loading the programs or as a work area for the loaded programs. By the CPU 111 executing the programs loaded on the RAM, various functions can be embodied. The HDD 114 stores programs and various data used by the programs. The NVRAM 115 stores various setup information.

The scanner 12 is hardware (image reading unit) for reading image data from a paper document. The printer 13 is hardware (printing unit) for printing print data on a paper. The modem 14 is hardware for connecting the imaging device 10 to a telephone line, and is used for transmitting or receiving image data with facsimile communication. The operation panel 15 includes an input device such as buttons for receiving an input from a user, and a display device such as a liquid crystal panel. The network interface 16 is hardware for connecting the imaging device 10 to a network such as a LAN. The network to be connected may be a wired network or a wireless network. Note that the operation panel 15 may be configured by an information processing terminal having a CPU independent of the controller 11, such as a tablet terminal or a smartphone. In this case, the operation panel 15 is connected to the controller via a wired communication media or a wireless communication media.

The SD card slot 17 is used for reading a program stored in an SD card 80. That is, not only a program stored in the ROM 113, but also a program stored in the SD card 80 may be loaded into the RAM 112 and executed in the imaging device 10. Further, other recording media (for example, a CD-ROM, a USB (Universal Serial Bus) memory, and the like) may be used instead of the SD card 80. That is, types of recording media corresponding to the SD card 80 are not limited to a specific type. When a recording medium other than the SD card 80 is used, the SD card slot 17 may be replaced with a hardware corresponding to the type of the recording device to be used.

FIG. 4 is a diagram illustrating an example of a functional configuration of the information processing system according to the first embodiment. The service providing apparatus 20 includes a WF service module 21 and an authentication service module 22, and the like. By the CPU 204 executing at least one program installed in the service providing apparatus 20, functions performed by these modules can be embodied. The service providing apparatus 20 also uses a user information storage unit 23. The user information storage unit 23 can be embodied by a storage device such as the auxiliary storage device 202, or a storage device connectable to the service providing apparatus 20 via a network.

The WF service module 21 executes a workflow for accessing the cloud storage 40. The workflow is defined in advance. Examples of the workflow include a workflow for delivering (uploading) data to the cloud storage 40, a workflow for uploading data generated by performing a series of processes such as OCR in the service providing apparatus 20, and a workflow for downloading data stored in the cloud storage 40.

The authentication service module 22 authenticates access from the imaging device 10 to the service providing apparatus 20.

The user information storage unit 23 stores identification information of users who are permitted to access the service providing apparatus 20.

The imaging device 10 includes multiple application programs such as an AP 121a and an AP 121b (hereinafter these are referred to as "AP 121" when both of these need not be distinguished), an authentication module 122, a unified API (Application Programming Interface) module 123, a service coordination module 124, and the like. By the CPU 111 (or the CPU in the operation panel 15) executing at least one program installed in the controller 11 or the operation panel 15, functions performed by these modules can be embodied. The imaging device 10 also uses an authentication information storage unit 131 and an access information storage unit 132. These storage units can be embodied by a storage device such as the HDD 114, a storage device in the operation panel 15, or a storage device connectable to the imaging device 10 via a network.

The AP 121 is an example of a program installed in the imaging device 10. In the present embodiment, each AP 121 provides a function utilizing the cloud storage 40. Examples of the function utilizing the cloud storage 40 include a function to deliver image data scanned at the imaging device 10 to the cloud storage 40, and a function to print data stored in the cloud storage 40 using the imaging device 10.

The authentication module 122 authenticates users logging on the imaging device 10. That is, the authentication module 122 identifies a user operating the imaging device 10.

The unified API module 123 provides the APs 121 with an API (function or method) of unified (common) format corresponding to a same (or similar) request/function supported by each of the cloud storages 40 (even when an API of different format with respect to the same (or similar) request/function is provided by each of the cloud storages 40, the unified API module 123 provides the APs 121 with an API of common format). Hereinafter, the common interface provided by the unified API module 123 is referred to as a "unified API". In FIG. 4, the unified API module 123 is illustrated for each AP 121, which represents that the unified API module 123 is linked to each AP 121. This diagram does not mean that different unified API modules are respectively provided with APs 121.

The service coordination module 124 provides a service to facilitate use of the cloud storage 40 coordinating with the service providing apparatus 20. The service coordination module 124 includes a WF coordination module 125, an authentication coordination module 126, and the like, as illustrated in FIG. 4.

When a unified API for requesting an execution of a workflow is called by the AP 121, the WF coordination module 125 transmits a request (processing request) for executing the workflow (corresponding to the unified AP which was called by the AP 121) to the WF service module 21 in the service providing apparatus 20.

The authentication coordination module 126 controls authentication processing which is required for coordinating with the service providing apparatus 20.

The authentication information storage unit 131 stores authentication information for each user. The authentication information includes information which is necessary when a user logs in to the imaging device 10, such as a user ID, password, and the like.

The access information storage unit 132 stores information necessary for accessing the service providing apparatus 20 for each user.

As is clear from the above description, each AP 121 does not call APIs supported by the cloud storage 40, but calls unified APIs to access the cloud storage 40 by way of the service coordination module 124 and the service providing apparatus 20. Hence, the unified API module 123, the service coordination module 124, and the service providing apparatus 20 act as a platform to facilitate access to the cloud storage 40.

Figure 5A:
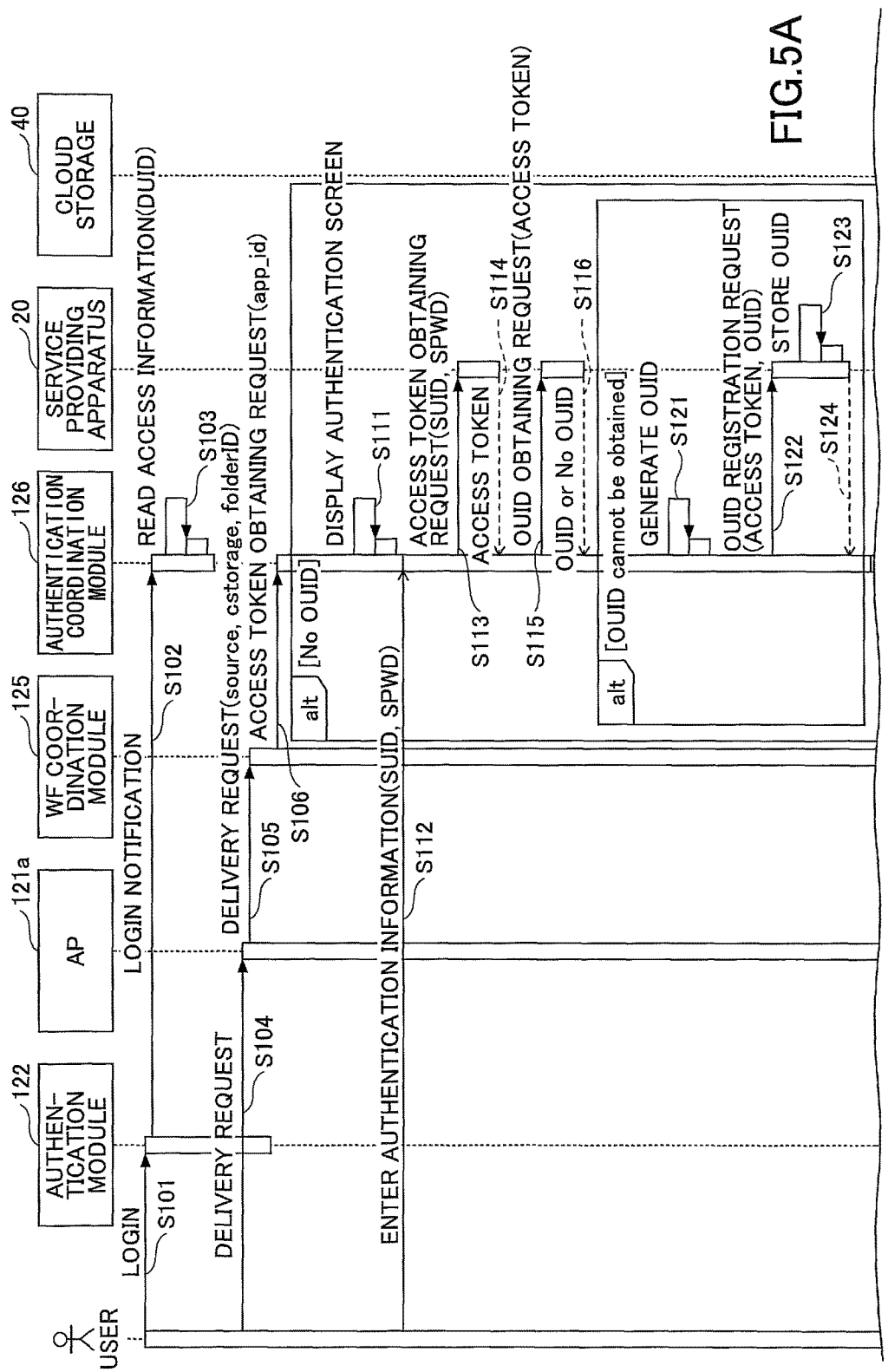
FIG. 5A is a sequence diagram illustrating an example of a flow of a process performed in the information processing system according to the first embodiment.
Figure 5B:
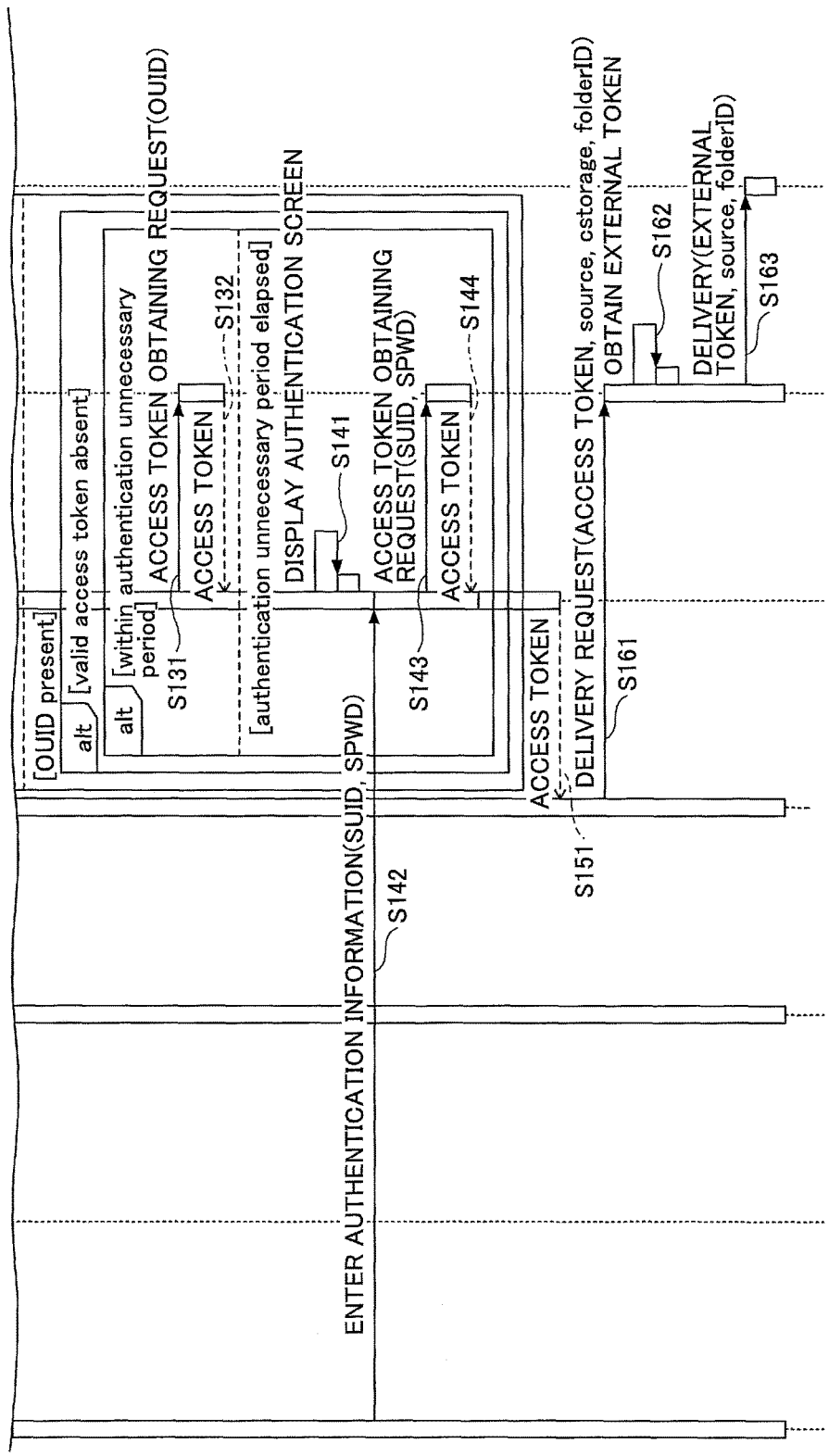
FIG. 5B is a sequence diagram illustrating an example of a flow of a process performed in the information processing system according to the first embodiment.

In the following, a flow of a process performed in the information processing system 1 will be described. FIGS. 5A to 5B are a set of sequence diagrams illustrating an example of a flow of a process performed in the information processing system 1 according to the first embodiment. Just before step S101 is performed in FIG. 5A, the operation panel 15 is displaying a log-in screen for a user logging in to the imaging device 10.

When a user enters a user ID and a password of the user using the log-in screen, the authentication module 122 determines whether login of the user is allowed or not, by collating a combination of the user ID and the password with the authentication information stored in the authentication information storage unit 131 (S101). With respect to an authentication processing, in the present embodiment, described is an example in which user authentication is performed by a user's input of information required for authentication using the log-in screen on the operation panel 15. But in another embodiment, user authentication may be performed using a card (such as an IC (Integrated Circuit) card) storing user information. Further, a recording medium which can be used for storing user information is not limited to a card such as an IC card. An information terminal device equipped with a function for authentication (e.g. the information terminal device in which an application program for authentication is installed), such as a smartphone and a cellular phone, can also be used for user authentication similarly to the IC card. That is, any type of devices or media capable of storing user information can be used in the present embodiment.

Figure 6:
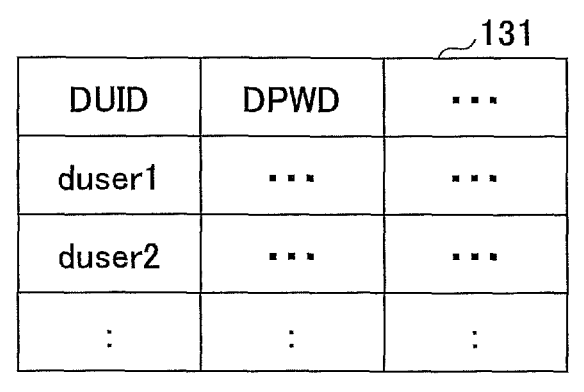

FIG. 6 is a diagram illustrating an example of a configuration of the authentication information storage unit 131. As illustrated in FIG. 6, the authentication information storage unit 131 stores a DUID, a DPWD, and the like, for each user. The DUID is a user ID (identification information of a user) assigned to each user, which is used when a user logs in to the imaging device 10. The DPWD is a password corresponding to the DUID. A combination of the DUID and the DPWD for one user may be different for each imaging device 10.

At step S101, if the combination of the DUID and the DPWD which is equal to the entered combination of the user ID and the password is stored in the authentication information storage unit 131, login of the user is allowed. But if not, login of the user is denied.

When login of the user is allowed, the authentication module 122 sends a notification to the authentication coordination module 126 that the user (hereinafter, the user will be referred to as a "login user") has logged in. The notification sent to the authentication coordination module 126 includes the DUID of the login user.

In response to receiving the notification, the authentication coordination module 126 loads (reads) access information containing the DUID from the access information storage unit 132 to the RAM 112 (S103).

FIG. 7 is a diagram illustrating an example of a configuration of the access information storage unit 132. As illustrated in FIG. 7, the access information storage unit 132 stores, for each user previously logged in to at least one of the cloud storage 40, a DUID, an SUID, a last authenticated date, an QUID, an ATOKEN, an expiration date, an allow list, a deny list, and the like.

The SUID is a user ID of a user corresponding to the DUID, which is used when the user logs in to the service providing apparatus 20. Note that multiple SUIDs may be assigned to one user. FIG. 7 illustrates an example in which two SUIDs are assigned to a user having a DUID "duser1". The SUID may contain identification information of the user environment E1, which is unique for each user environment. If the SUID contains identification information unique to the user environment E1, a case in which duplicate SUIDs across different user environments are generated is easily avoided.

The last authenticated date represents a date (year, month, and day) when authentication of a user with the SUID was last performed (and the authentication succeeded). In other words, the last authenticated date is a date when an access token (ATOKEN) was last generated.

The OUID is identification information of a user, which may be referred to as an on-premises ID in the present embodiment. The on-premises ID may be an ID assigned, in the user environment (on-premises environment) E1, to each user. In the present embodiment, the on-premises ID is automatically generated by the imaging device 10.

The ATOKEN is an access token which is used for accessing the service providing apparatus 20. An access token is an example of data denoting that authentication has been made by the service providing apparatus 20. The expiration date represents an expiration date of the corresponding access token. The allow list stores a list of identification information (hereinafter, the identification information will be referred to as an "APP-ID") of the AP(s) 121 by which an access to the service providing apparatus 20 is allowed. The deny list stores a list of APP-IDs by which an access to the service providing apparatus 20 is not allowed.

At step S103, the authentication coordination module 126 loads (reads) access information containing the DUID of the login user into the RAM 112, when the access information is stored in the access information storage unit 132. If access information containing the corresponding DUID is not stored in the access information storage unit 132, new access information containing the corresponding DUID is generated, is recorded in the access information storage unit 132, and is loaded into the RAM 112. The new access information to be generated here may include only the corresponding DUID. Hereinafter, the access information loaded into the RAM 112 is referred to as "target access information".

When the user issues a request (S104), by using the AP 121a for example, to deliver data by designating identification information of data to be delivered (hereinafter referred to as "source"), identification information of the cloud storage 40 where data is to be delivered (hereinafter referred to as "cstorage"), and a folder ID of a folder where data is to be delivered (hereinafter referred to as "folderID"), the AP 121a enters a delivery request, including the source, the cstorage, and the folderID, to the WF coordination module 125 (S105). The delivery request is entered using the unified API. The data to be delivered may be image data obtained by scanning a paper document using the imaging device 10, or may be data that is stored in advance in the imaging device. If image data obtained by scanning a paper document using the imaging device 10 is to be delivered, the AP 121a first makes the imaging device 10 scan the paper document, then enters a delivery request for delivering the scanned image data to the WF coordination module 125.

In response to receiving the delivery request, the WF coordination module 125 issues a request to the authentication coordination module 126 for obtaining an access token of the login user (S106). The request includes an application ID (may be referred to as an "app id") of the AP 121a requesting the delivery of data.

When receiving the request for obtaining an access token, the authentication coordination module 126 branches processing in accordance with contents of the target access information. If the target access information does not include an QUID (if an QUID corresponding to the user has not been generated), the authentication coordination module 126 displays an authentication screen on the operation panel 15 (S111).

Figure 8:
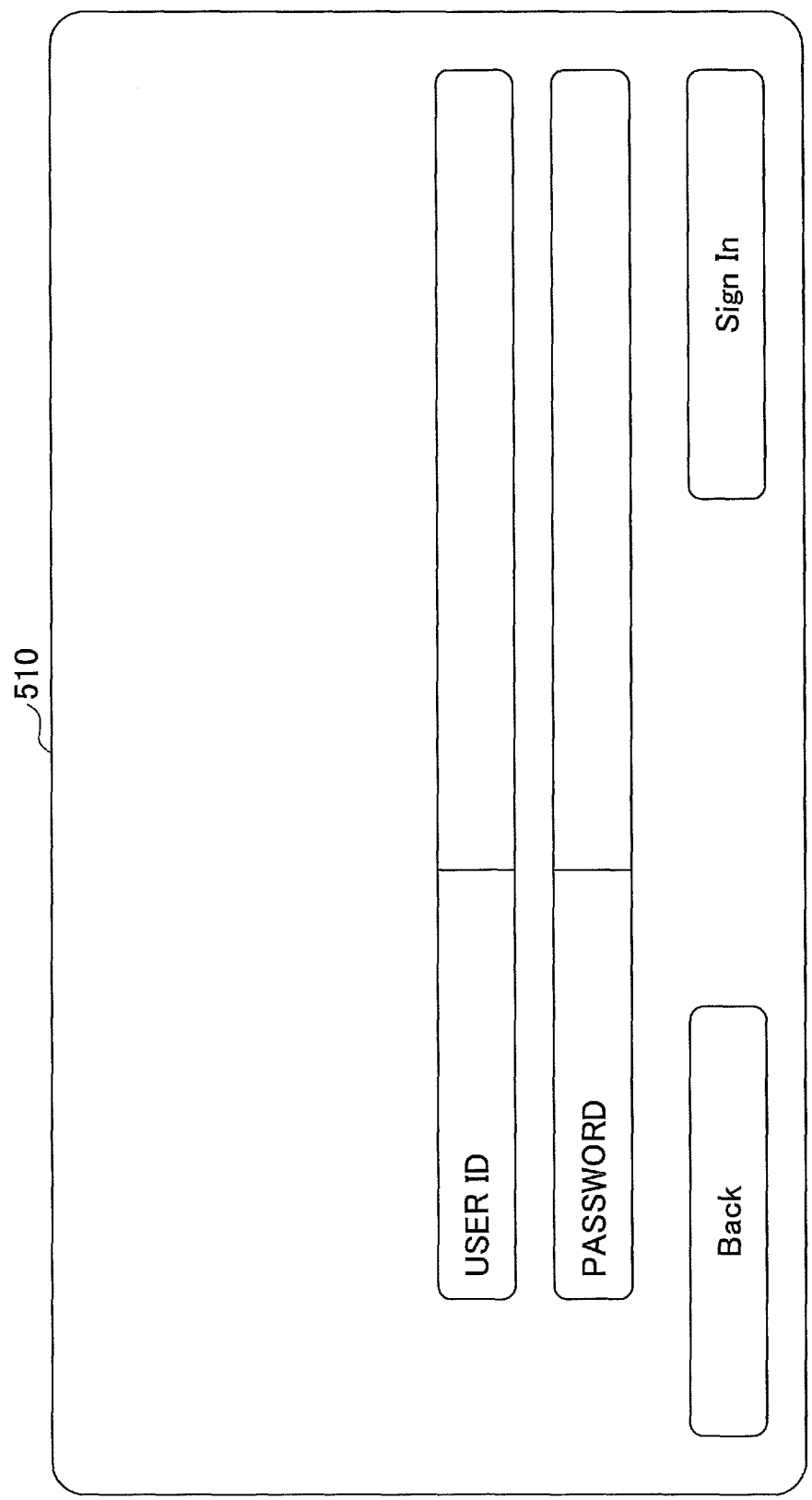
FIG. 8 is a diagram illustrating a display example of an authentication screen.

FIG. 8 is a diagram illustrating a display example of the authentication screen. As illustrated in FIG. 8, the authentication screen 510 is a screen for receiving a user ID (SUID) and a password from a user logging in to the service providing apparatus 20. The password corresponding to the SUID is referred to as an "SPWD".

When an SUID and an SPWD are entered to the authentication screen 510 (S112), the authentication coordination module 126 issues an access token obtaining request to the authentication service module 22 in the service providing apparatus 20 (S113). The request includes a set of the SUID and the SPWD entered to the authentication screen 510.

The authentication service module 22 authenticates with the SUID and the SPWD included in the request. That is, the authentication service module 22 determines whether the set of the SUID and the SPWD is stored in the user information storage unit 23. If the set is stored in the user information storage unit 23, the authentication succeeds, and if not, the authentication fails.

FIG. 9 is a diagram illustrating an example of a configuration of the user information storage unit 23 according to the first embodiment. As illustrated in FIG. 9, the user information storage unit 23 stores, for each SUID, an SPWD, an ATOKEN, an expiration date, an external token, an QUID, and the like. The ATOKEN is a generated access token for the user corresponding to the SUID. The ATOKEN is used by the user corresponding to the SUID for accessing the cloud storage 40 to which access is allowed, and is defined in advance for each SUID. The expiration date represents an expiration date of the corresponding access token. The external token is authentication information used for accessing the cloud storage 40. Because the external token is different for each cloud storage 40, multiple external tokens, each of which is used for accessing different cloud storage 40, may be stored for one SUID. That is, in the present embodiment, authentication information used for accessing the cloud storage 40 is associated with each user (SUID) in advance.

In the QUID field, the QUID of the user corresponding to the SUID, which is notified from the imaging device 10, is stored. Note that, with respect to a certain user, when no ATOKEN or expiration date for the certain user is stored in the imaging device 10, the user information storage unit 23 does not store the ATOKEN or expiration date for the certain user. Similarly, when an QUID for a certain user is not stored in the imaging device 10, the user information storage unit 23 does not store the QUID for the certain user.

When the authentication has succeeded, the authentication service module 22 generates an access token based on the SUID and the like, and stores the access token and an expiration date of the access token into the user information storage unit 23, by correlating with the SUID. The authentication service module 22 also returns the access token and an expiration date of the access token to the authentication coordination module 126 (S114).

The authentication coordination module 126 adds the access token and an expiration date of the access token to the target access information. The authentication coordination module 126 also records the current date as the last authenticated date of the target access information. If the SUID is not included in the target access information, the authentication coordination module 126 adds the SUID to the target access information. The authentication coordination module 126 also adds an APP-ID of the AP 121*a* to the allow list of the target access information. The above updates to the target access information are also applied to the access information storage unit 132. When the authentication fails, an access token is not returned at step S114. Instead, a response indicating that the authentication has failed is returned.

When the authentication succeeded and the access token is received, the authentication coordination module 126 issues an QUID obtaining request to the authentication service module 22 in the service providing apparatus 20 (S115). The obtaining request includes the received access token.

The authentication service module 22 obtains, from the user information storage unit 23 (FIG. 9), the QUID corresponding to the access token (ATOKEN) included in the obtaining request, and returns the QUID to the authentication coordination module 126 (S116). However, if the QUID corresponding to the access token is not stored in the user information storage unit 23, the authentication service module 22 returns a response indicating that no QUID is found. Note that, in the present embodiment, multiple OUIDs can be associated with the same SUID (or the same access token). For example, when a certain user (user A) uses multiple imaging devices 10 and a same SUID of the user A is used for accessing each of the imaging devices 10, an QUID is generated for each of the imaging devices 10 and each QUID is associated with the SUID (of the user A). In this case, multiple OUIDs are returned at step S116.

When one or more OUIDs are returned, and the returned OUIDs include an QUID containing a unique number of a relevant imaging device 10 (that is, an QUID corresponding to the imaging device 10 where the login user is accessing), the authentication coordination module 126 adds the QUID corresponding to the imaging device 10 which is being accessed by the login user to the target access information, and the process proceeds to step S151. The QUID added to the target access information is also added to the information stored in the access information storage unit 132.

On the other hand, if no QUID is returned, or if an QUID containing a unique number of the relevant imaging device 10 is not included in the received OUIDs, steps S121 through S124 are executed, and then the process proceeds to step S151.

At step S121, the authentication coordination module 126 generates an QUID. For example, a value which is unique in an environment including multiple imaging devices 10 and multiple user environments (such as E1) may be generated as an QUID, based on a unique number of the relevant imaging device 10, the DUID of the login user, and the SUID of the login user. For example, when the unique number of the relevant imaging device 10 is 123, the DUID of the login user is "duser1", and the SUID of the login user is "suser1", a value "123_duser1_suser1" may be generated as the QUID.

Next, the authentication coordination module 126 issues an QUID registration request to the authentication service module 22 in the service providing apparatus 20 (S122). The registration request includes the access token and the generated QUID. In response to receiving the registration request, the authentication service module 22 stores the QUID included in the registration request into a record of the user information storage unit 23, in which the access token included in the registration request is included (S123). Next, the authentication service module 22 returns a response indicating that the registration of the QUID has been completed.

On the other hand, when step S106 is executed, if an QUID is included in the target access information, steps S111 through S123 will not be executed. In this case, if the access token included in the target access information has expired, steps S131 through S132, or steps S141 through S144 are executed.

Specifically, if a current time (when step S106 is executed) is within an authentication unnecessary period, steps S131 through S132 are executed. The authentication unnecessary period means a period in which a user is not required to input an SUID and an SPWD (a period in which the service providing apparatus 20 does not have to authenticate with an SUID and an SPWD). The authentication unnecessary period is a predetermined period from the last authenticated date, and may be set to the imaging device 10 by an administrator or the like. The authentication unnecessary period may be recorded in, for example, the HDD 114 or the NVRAM 115. That is, the authentication unnecessary period is determined by intention of the administrator or the like. The reason that the authentication unnecessary period is set will be described below.

The service providing apparatus 20, which is a source for generating an access token, is operated under the service providing environment E2 which is a different organization from the user environment E1. From a perspective of the service providing environment E2, to ensure security, it is preferable that an expiration period of an access token is shorter (for example, a few tens of minutes). However, the shorter an expiration period of an access token is, the more frequently users are required to input an SUID and an SPWD by displaying the authentication screen 510. As a result, convenience of users will be decreased. Hence, to enable users to choose which of the security and convenience is prioritized, the information processing system 1 is configured such that the authentication unnecessary period is configurable by users in the imaging device 10. That is, if a user sets the authentication unnecessary period to be longer (for example, a few days longer) than an expiration period of an access token, the user can benefit from the convenience of decrease of input frequency of an SUID and an SPWD at the user's own responsibility, while accepting some decrease in security.

To enable convenience, if a time from the last authenticated date to a current time is not more than the authentication unnecessary period, the authentication coordination module 126 issues an access token obtaining request to the authentication service module 22 in the service providing apparatus 20 without performing display of the authentication screen 510 (S131). The obtaining request includes the QUID of the target access information. If the QUID included in the obtaining request is stored in the user information storage unit 23, the authentication service module 22 generates a new access token, and returns the new access token and an expiration date of the new access token (S132). Note that the access token generated here and the expiration date are stored in the user information storage unit 23, correlated with the QUID.

When the access token and the expiration date of the access token are received, the authentication coordination module 126 updates, with the access token and the expiration date of the access token, the ATOKEN and the expiration date in the target access information. Note that the above update to the target access information is also applied to the access information storage unit 132.

On the other hand, if a time from the last authenticated date to a current time is more than the authentication unnecessary period, steps S141 through S144, which are the same process as the steps S111 through S114, are executed.

After step S106, S115, S124, S132, or S144, the authentication coordination module 126 returns the access token included in the target access information to the WF coordination module 125 (S151). However, when executing step S151, if the access token is not included in the target access information, an error is returned.

Next, the WF coordination module 125 issues a delivery request to the WF service module 21 in the service providing apparatus 20 (S161). The delivery request at least includes the access token obtained at step S151, the source, the cstorage, and the folderID designated with the delivery request received at step S105.

When the WF service module 21 receives the delivery request, the WF service module 21 executes step S162 if the access token included in the delivery request is valid. That is, if the access token included in the delivery request is stored in the user information storage unit 23 and the access token has not expired, step S162 is executed.

At step S162, the WF service module 21 obtains an external token corresponding to the cstorage from the user information storage unit 23 (FIG. 9). Next, the WF service module 21 delivers (uploads) the data to be delivered into the folder where the data is to be delivered (the folder identified by the folderID) in the cloud storage 40 where the data is to be delivered (the cloud storage 40 identified by the cstorage) (S163). When delivering (uploading) the data, the external token is used. Note that the delivery is performed by calling an original API supported by the cloud storage 40 where the data is to be delivered. As a result, the source (the data to be delivered) is stored in the folder (the folder identified by the folderID).

After an access token of a login user was obtained by executing the series of the processes illustrated in FIGS. 5A to 5B, when the authentication coordination module 126 receives the request for obtaining the access token at step S106 in FIG. 5A, the authentication coordination module 126 immediately returns the access token (S151). That is, while the login user is being logged in, if the unified API is called by the AP 121a, the same access token is used. Further, if the login user calls the unified API by using another AP 121 (such as the AP 121b), the same access token as the access token, which was used when the AP 121a calls the unified API, is used. As a result, single sign-on across multiple APs 121 can be achieved when a user accesses the service providing apparatus 20. Further, the access token remains valid even when a login user has logged off, while an expiration period has not elapsed. That is, when the login user again logs in after the login user has logged off, the login user does not need to enter his/her SUID and SPWD if an expiration period of the access token has not elapsed.

Further, respective external tokens used for accessing each of the cloud storages 40 are stored in the service providing apparatus 20 in advance associated with each SUID of each user. Hence, even when a login user changes the cloud storage 40 to which data is to be delivered, the authentication screen 510 is not required to be displayed for the login user if a valid access token of the login user has been obtained. Accordingly, single sign-on across multiple cloud storages 40 can be achieved.

As described above, the information processing system 1 according to the first embodiment can reduce input frequency of authentication information by a user. Accordingly, operability of an apparatus accessing (using) external services will be improved.

Further, according to the first embodiment, because the unified APIs are provided, presence of original APIs supported by the respective cloud storage 40 is hidden. Hence, each AP 121 becomes less dependent on the different original APIs supported by the respective cloud storage 40. As a result, efficiency of developing programs using an external service (cloud storage 40) of the imaging device 10 can be improved.

The above description described an example in which the AP 121a requests the WF coordination module 125 to deliver (upload) data. However, in a case in which the AP 121b requests the WF coordination module 125 to download data, a flow of processes are similar. Specifically, the delivery request at step S105 may be replaced with a download request. The download request includes identification information of the cloud storage 40 from which data is downloaded, identification information of data to be downloaded, folder information of download location, and the like. The download location represents a location in which the downloaded data is saved. In this case, at steps S161 through S163, a download process in accordance with the download request may be performed.

Next, a second embodiment will be described. In the second embodiment, differences from the first embodiment will be described. Accordingly, what is not described in the second embodiment may be the same as that described in the first embodiment.

In the second embodiment, an example in which authentication processing performed in the authentication module 122 (hereinafter referred to as "apparatus authentication") is disabled will be explained. A state in which the apparatus authentication is disabled means that a log-in is not requested when a user starts using an imaging device 10. Whether the apparatus authentication is enabled or disabled can be set for each imaging device 10. When the imaging device 10 is configured such that the apparatus authentication is enabled, steps S101 through S103 in FIG. 5A are executed.

Hence, in the second embodiment, steps S101 through S103 in FIG. 5A are not executed. In this case, because a DUID is not identified, the authentication coordination module 126 assigns a common DUID to every user. Suppose that, in the following description, the common DUID is "guest". The assignment of the common DUID is performed when the apparatus authentication is disabled, or when the imaging device 10 is restarted after the apparatus authentication of the imaging device 10 was set to disabled. At these times, the authentication module 122 sends a notification to the authentication coordination module 126 that the apparatus authentication is disabled. When the authentication coordination module 126 receives the notification, the authentication coordination module 126 determines that the common DUID is used as a DUID of each user.

In this case, when user A accesses the imaging device 10 and steps S104 and thereafter in FIGS. 5A to 5B are executed, as a result of executing steps S111 through S124, access information whose DUID is "guest" is registered to the access information storage unit 132. The access information includes an OUID which contains the DUID (guest), a unique number of the imaging device 10, and an SUID of user A. The OUID is also stored in the user information storage unit 23 in the service providing apparatus 20 associated with the SUID of user A.

Suppose the case in which user B next accesses the imaging device 10 and steps S104 and thereafter in FIGS. 5A to 5B are executed. In this case, at step S106, the authentication coordination module 126 determines whether access information whose DUID is "guest" contains an QUID or not. As a result of the determination, an access token corresponding to user A is returned to the WF coordination module 125. Hence, with respect to the request to deliver data issued by user B, data delivery will be performed based on the SUID of user A, and image data of user B is delivered to, for example, a folder corresponding to user A.

Figure 10A:
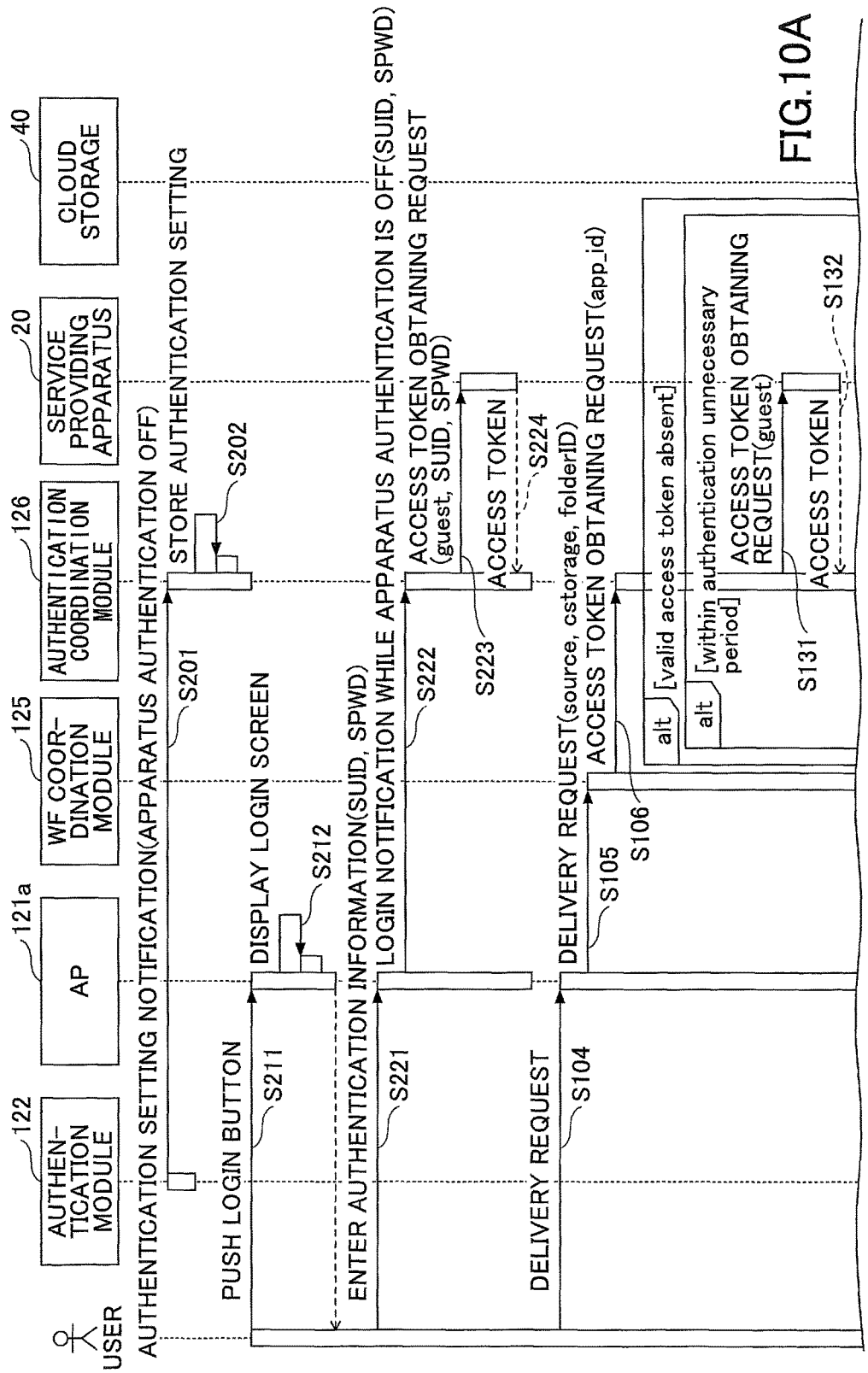
FIG. 10A is a sequence diagram illustrating an example of a flow of a process performed in an information processing system according to a second embodiment.
Figure 10B:
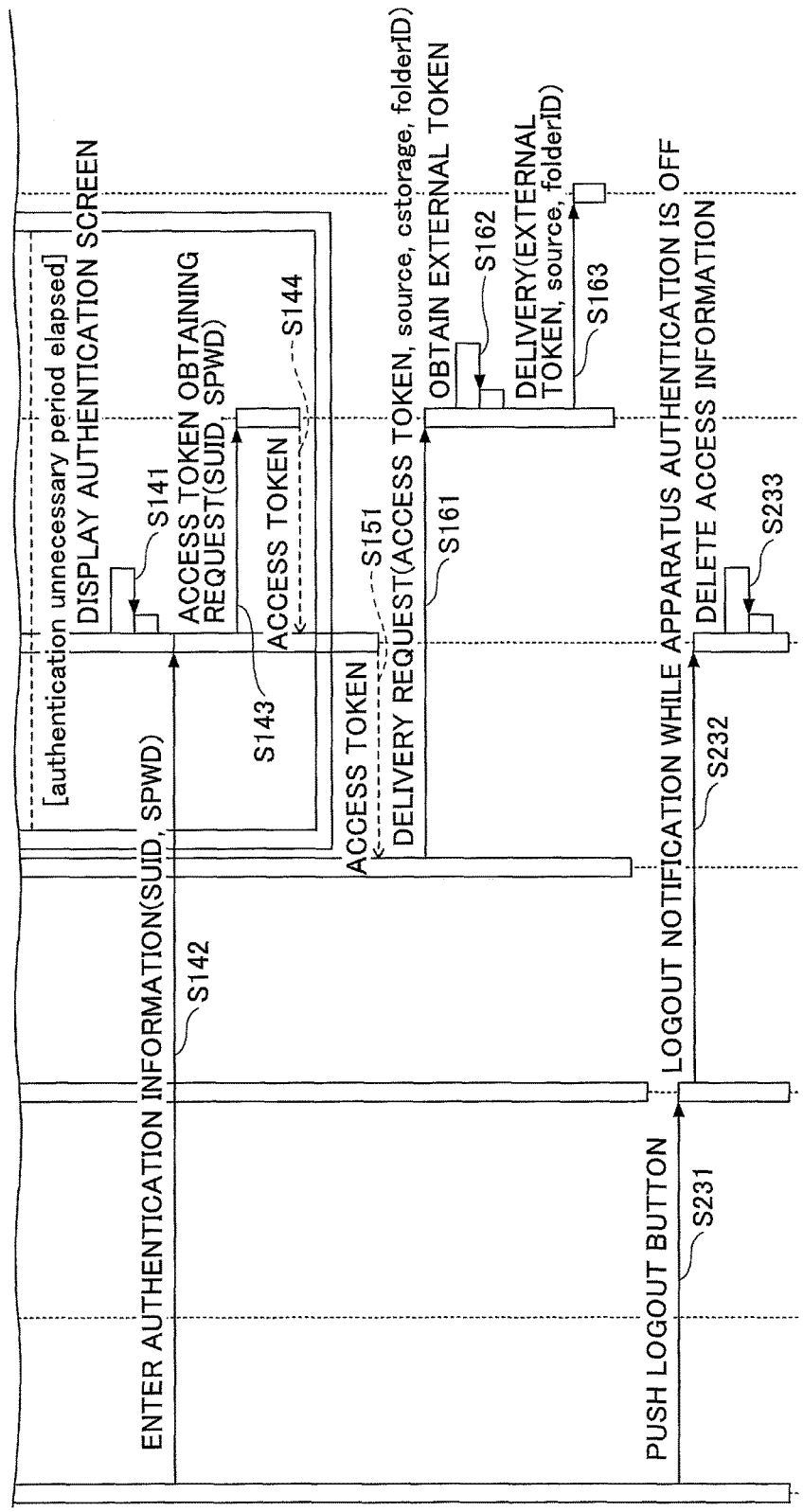
FIG. 10B is a sequence diagram illustrating an example of a flow of a process performed in an information processing system according to a second embodiment.

To avoid the above problem, in the second embodiment, a flow of the process illustrated in FIGS. 10A to 10B is performed.

FIGS. 10A to 10B are a set of sequence diagrams illustrating an example of a flow of a process performed in the information processing system according to the second embodiment. With respect to a step in FIGS. 10A to 10B equivalent (or similar) to the step in FIGS. 5A to 5B, the same reference number is attached and the description about the step will be omitted.

When the imaging device 10 is started, or when an apparatus authentication setting is changed, the authentication module 122 sends setting information concerning the apparatus authentication to the authentication coordination module 126 (S201). Specifically, the authentication coordination module 126 receives the information indicating that the apparatus authentication is disabled (OFF). The authentication coordination module 126 stores that the apparatus authentication is disabled (S202). By storing that the apparatus authentication is disabled, the authentication coordination module 126 can determine that a process different from the process performed in a case in which the apparatus authentication is enabled (FIGS. 5A to 5B) should be performed.

In the second embodiment, a login button is provided on an operation screen of the AP 121a. When the login button is pushed by user A (S211), the AP 121a displays a login screen for inputting account information (SUID and SPWD) for the service providing apparatus 20 on the operation panel 15 (S212).

When user A enters his/her SUID and SPWD using the login screen (S221), the AP 121a sends a notification to the authentication coordination module 126, by using a unified API, that login is performed during a state when the apparatus authentication is OFF (disabled) (S222). The notification includes the SUID and the SPWD entered through the login screen. In response to receiving the notification, the authentication coordination module 126 issues an access token obtaining request to the authentication service module 22 in the service providing apparatus 20 (S223). The request includes a DUID "guest", the SUID and the SPWD entered to the authentication screen 510. Note that "guest" included in the request is also information for designating an OUID.

In response to receiving the request, the authentication service module 22 authenticates with the SUID and the SPWD included in the request. When the authentication succeeds, the authentication service module 22 generates an access token, and returns the access token and an expiration date of the access token (S224). However, when an access token corresponding to the SUID has already been stored in the user information storage unit 23, the access token (stored in the user information storage unit 23) and a corresponding expiration date are returned. Note that the generated access token and the expiration date of the access token are stored into the user information storage unit 23 (FIG. 9), by correlating with the SUID and the QUID ("guest").

The authentication coordination module 126 stores access information, including the returned access token, the returned expiration date, the entered SUID, and "guest", into the access information storage unit 132, and stores the access information into the RAM 112 as target access information. Note that "guest" is included in the access information as the DUID and the QUID.

Next, steps S104 through S106 are executed. If the access token in the target access information has expired when steps S104 through S106 are executed, steps S131 and S132, or steps S141 through S144, which are explained with reference to FIG. 5B, are executed. Note that an QUID included in the access token obtaining request, which is issued at step S131 in the present embodiment, is "guest".

Next, steps S151 through S163 are executed. After these steps are executed, when user A finishes using the AP 121a, user A pushes a logout button provided on the operation screen of the AP 121a (S231). When the logout button is pushed, the AP 121a sends a notification to the authentication coordination module 126 that logout is instructed, by using a unified API (S232). In response to receiving the notification, at step S233, the authentication coordination module 126 deletes access information corresponding to the target access information from the access information storage unit 132 (FIG. 7). As a result, when, for example, user B next uses the AP 121a on the imaging device 10, a case in which data delivery of user B will be performed based on the SUID of user A can be avoided. This is because access information corresponding to the SUID of user B is stored in the access information storage unit 132.

Note that the logout button provided by the AP 121a may be pushed by user B instead of user A. Also, in another embodiment, step S233 may be automatically performed, when the imaging device 10 shifts to energy-saving mode, or if the imaging device 10 has not been operated for more than a certain period of time.

Next, a third embodiment will be described. In the third embodiment, differences from the first or the second embodiment will be described. Accordingly, what is not described in the third embodiment may be the same as that described in the first or second embodiment.

Figure 11:
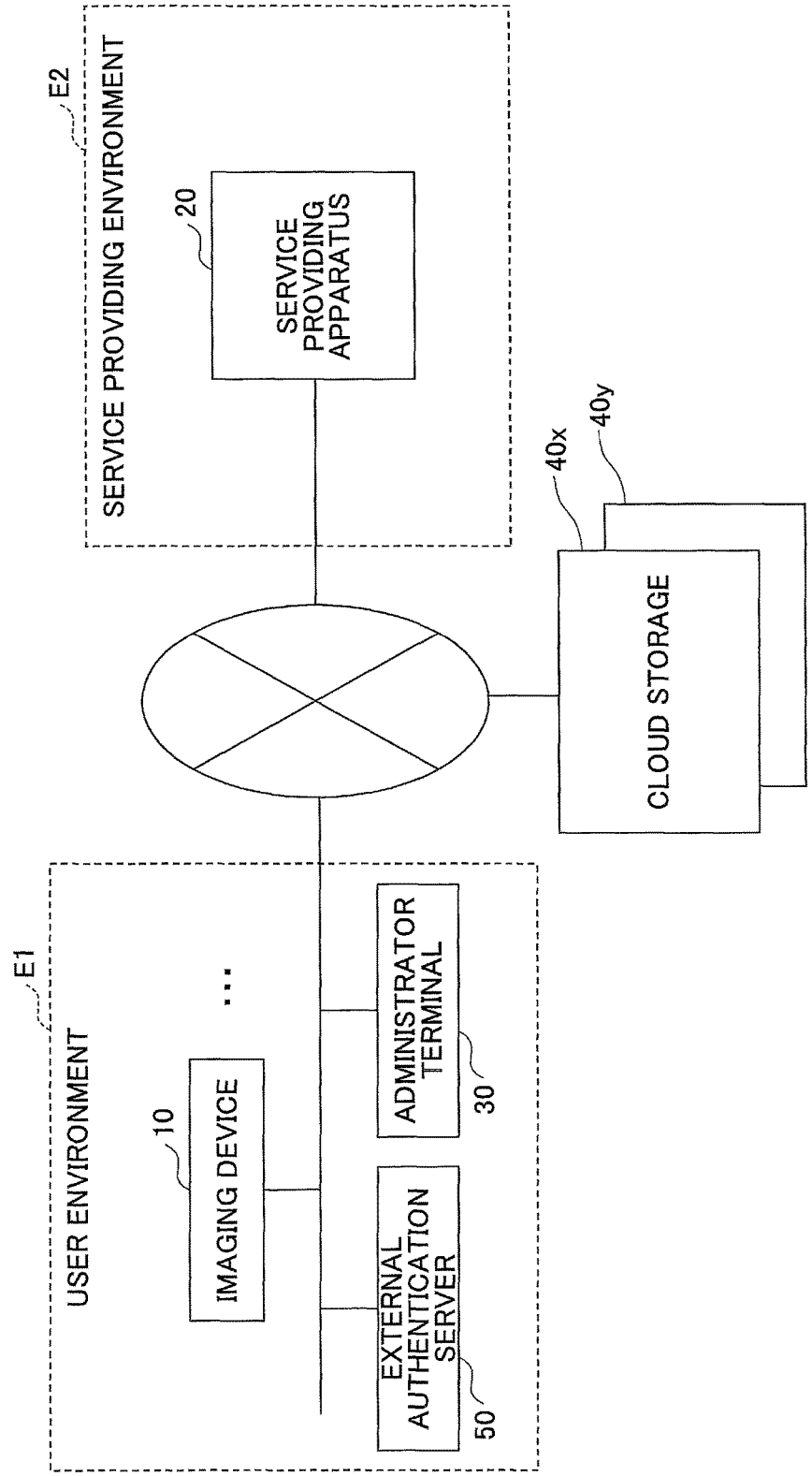
FIG. 11 is a diagram illustrating an example of a configuration of an information processing system according to a third embodiment.

FIG. 11 is a diagram illustrating an example of a configuration of an information processing system according to the third embodiment. In FIG. 11, with respect to the same elements as those illustrated in FIG. 1, the same reference symbols are attached, and the description of the same elements as those illustrated in FIG. 1 will be omitted. In FIG. 11, the user environment E1 further includes an external authentication server 50. The external authentication server 50 is coupled to the imaging device via a network such as a LAN.

The external authentication server 50 authenticates users logging on the imaging device 10. That is, the third embodiment describes an example in which the imaging device 10 is configured such that authentication is not performed by the authentication module 122, but by the external authentication server 50.

FIG. 12 is a diagram illustrating an example of a functional configuration of the information processing system according to the third embodiment. In FIG. 12, with respect to the same elements as those illustrated in FIG. 4, the same reference symbols are attached, and the description of the same elements as those illustrated in FIG. 4 will be omitted. In FIG. 12, the imaging device 10 further includes an authentication customization module 127. The authentication customization module 127 is embodied by the CPU 111 executing a program (such as an application program).

The authentication customization module 127 controls authentication processing when a user logs in to the imaging device, instead of the authentication module 122. That is, the authentication customization module 127 displays an original login screen on the operation panel 15, and requests the external authentication server 50 to perform authentication processing using authentication information entered via the login screen.

Figure 13B:
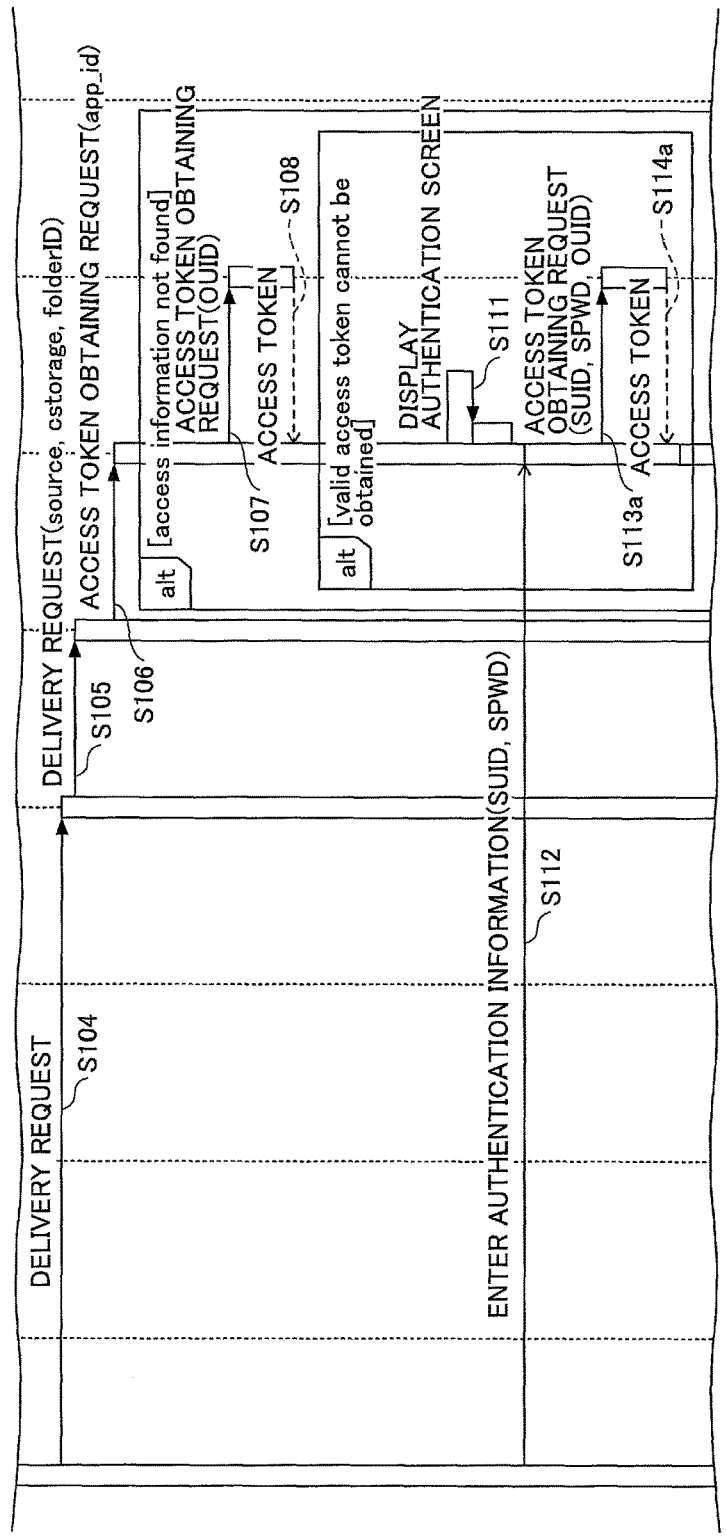
FIG. 13B is a sequence diagram illustrating an example of a flow of a process performed in the information processing system according to the third embodiment.
Figure 13C:
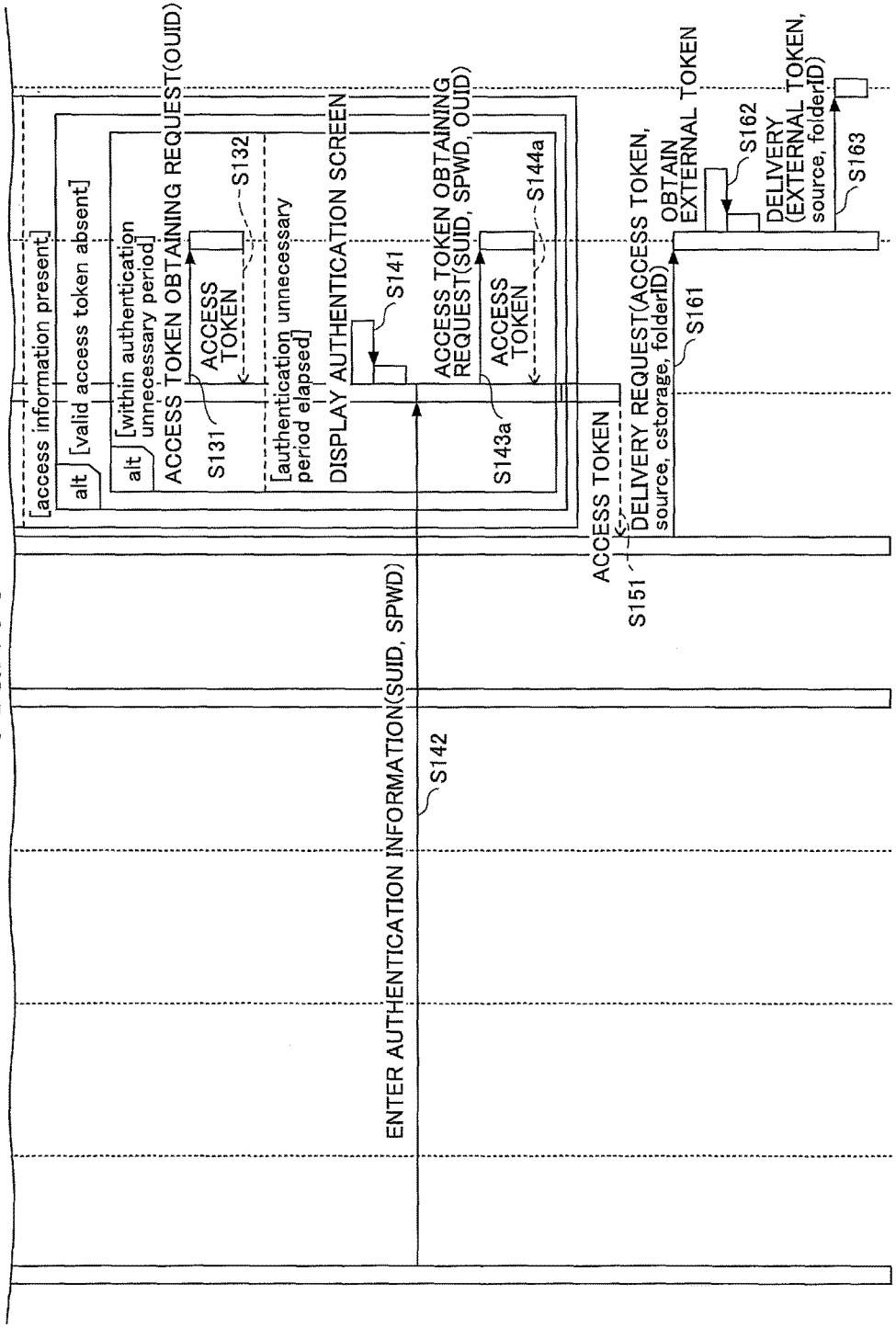
FIG. 13C is a sequence diagram illustrating an example of a flow of a process performed in the information processing system according to the third embodiment.

FIGS. 13A to 13C are a set of sequence diagrams illustrating an example of a flow of a process performed in the information processing system according to the third embodiment. With respect to a step in FIGS. 13A to 13C equivalent (or similar) to the step in FIGS. 5A to 5B, the same reference number is attached and the description about the step will be omitted.

When the imaging device 10 is started, or when a user logs out, the authentication module 122 performs inquiry of an authentication customization (S301). If a program which makes the imaging device 10 function as the authentication customization module 127 is installed in the imaging device 10, the authentication customization module 127 displays a login screen on the operation panel 15 in accordance with an implementation of the program (S302). The login screen may be a different screen from the authentication screen 510 displayed by the authentication module 122. Next, the authentication customization module 127 sends a notification to the authentication module 122 that the authentication customization is active (S303). If the program which makes the imaging device 10 function as the authentication customization module 127 is not installed in the imaging device 10, step S302 is not executed and the authentication module 122 receives a notification that the authentication customization is inactive. In this case, the authentication module 122 displays a login screen and steps S101 and thereafter illustrated in FIGS. 5A to 5B are executed.

In response to the notification that the authentication customization is active, the authentication module 122 sends a notification of an authentication setting to the authentication coordination module 126 (S304). The authentication coordination module 126 stores the notified authentication setting. Note that the authentication setting is information representing whether the authentication customization is active or not. The authentication setting notified here represents that the authentication customization is active.

Next, when a user enters authentication information using the login screen (S306), the authentication customization module 127 issues an authentication request to the external authentication server 50 for authenticating with the entered authentication information (S307). The authentication information may be a set of a user ID and a password, or may be information stored in a recording medium such as a card, as described in the first embodiment.

The external authentication server 50 authenticates with the authentication information (S308), and returns a response indicating whether the authentication has succeeded or not (S309). Note that the response includes a user ID of the authenticated user, if the authentication has succeeded. Next, the authentication customization module 127 sends an authentication result (whether the authentication has succeeded or not) to the authentication module 122 (S310). If the authentication has failed, steps S301 and thereafter are performed repeatedly. Accordingly, in this case, the login screen is displayed again.

If the authentication has succeeded, the authentication module 122 sends a notification to the authentication coordination module 126 that login was performed (S311). At the same time, the authentication customization module 127 sends the user ID of the user who has logged in to the authentication coordination module 126 (S312). When, for example, the user is authenticated with a card or the like, identification information of the card (card ID) may be used as the user ID. That is, any information can be used as the user ID, as long as the information can be distinguishable from each other.

When the authentication customization is active, the authentication coordination module 126 loads (reads) access information in which an QUID is the same as the notified user ID, from the access information storage unit 132 to the RAM 112 (S313). That is, in the third embodiment, the user ID identified by the external authentication server 50 is treated as an QUID. Hereinafter, the access information loaded into the RAM 112 is referred to as "target access information". There may be a case in which the corresponding access information is not found. In this case, the target access information is not loaded.

Subsequently, steps S104 through S106 are executed, similar to the process illustrated in FIGS. 5A to 5B, and request for obtaining an access token is sent to the authentication coordination module 126.

When receiving the request for obtaining an access token, the authentication coordination module 126 branches processing based on a presence or absence of the target access information.

When the target access information is not found (that is, the corresponding access information was not found at step S313), the authentication coordination module 126 issues an access token obtaining request to the authentication service module 22 in the service providing apparatus 20 (S107). The request includes the user ID notified at step S312 as an QUID. If the QUID included in the request is stored in the user information storage unit 23, and an access token corresponding to the QUID and an expiration date of the access token are also stored in the user information storage unit 23, the authentication service module 22 returns the access token and the expiration date (S108). If the QUID is stored in the user information storage unit 23, but an access token corresponding to the QUID is not stored in the user information storage unit 23, the authentication service module 22 generates an access token and returns the access token and the expiration date of the access token. At the same time, the access token and the expiration date are stored in the user information storage unit 23 associated with the QUID. Further, if the QUID is not stored in the user information storage unit 23, no access token is returned.

When an access token is not returned, or when the returned access token has expired, the authentication coordination module 126 displays the authentication screen 510 (FIG. 8) on the operation panel 15 (S111). When an SUID and an SPWD are entered via the authentication screen 510 (S112), the authentication coordination module 126 issues an access token obtaining request to the authentication service module 22 in the service providing apparatus 20 (S113a). The request includes the user ID notified at step S312 as an QUID, in addition to a set of the SUID and the SPWD entered via the authentication screen 510.

The authentication service module 22 authenticates with the SUID and the SPWD included in the request. If the authentication has succeeded, the authentication service module 22 generates an access token, and stores the access token and an expiration date of the access token into the user information storage unit 23, by correlating with the QUID and the SUID included in the obtaining request. Next, the authentication service module 22 returns the access token and the expiration date of the access token to the authentication coordination module 126 (S114a). The authentication coordination module 126 stores access information, which includes the access token, the expiration date, and an allow list including an APP-ID of the AP 121a, into the access information storage unit 132 (FIG. 7), and loads the stored access information into the RAM 112. Note that the user ID notified at step S312 is included, as an QUID, in the access information.

On the other hand, when the target access information was found (that is, the corresponding access information can be loaded at step S313), if the valid access token is not included in the target access information, steps S131 through S132, or steps S141 through S144 are executed. That is, similar to the process illustrated in FIGS. 5A to 5B, when it is within an authentication unnecessary period, steps S131 through S132 are executed.

When the authentication unnecessary period has passed, steps S141 through S144 are executed, similar to the process illustrated in FIGS. 5A to 5B. Subsequently, steps S143a and S144a are executed. Steps S143a and S144a are respectively the same processes as the steps S113a and S114a.

Steps S151 and thereafter are the same processes as described in the first embodiment with reference to FIGS. 5A to 5B.

As described above, according to the third embodiment, a user ID managed in the external authentication server 50 is used as an QUID, associated with an SUID. Therefore, the imaging device 10 can coordinate with a service provided by the service providing apparatus 20 without any inconvenience, even when an authentication function in the imaging device 10 was customized.

Next, a fourth embodiment will be described. In the fourth embodiment, differences from the third embodiment will be described. Accordingly, what is not described in the fourth embodiment may be the same as that described in the third embodiment.

In the third embodiment, because the external authentication server 50 centrally performs authentication of users accessing multiple imaging devices 10, a common user ID is used by a person when the person accesses multiple imaging devices 10. Further, because the common user ID is also used as an OUID, the QUID of the person is also common to multiple imaging devices 10 in the user environment E1. In the fourth embodiment, a merit (convenience) obtained by using a common QUID to the multiple imaging devices 10 will be described.

Figure 14B:
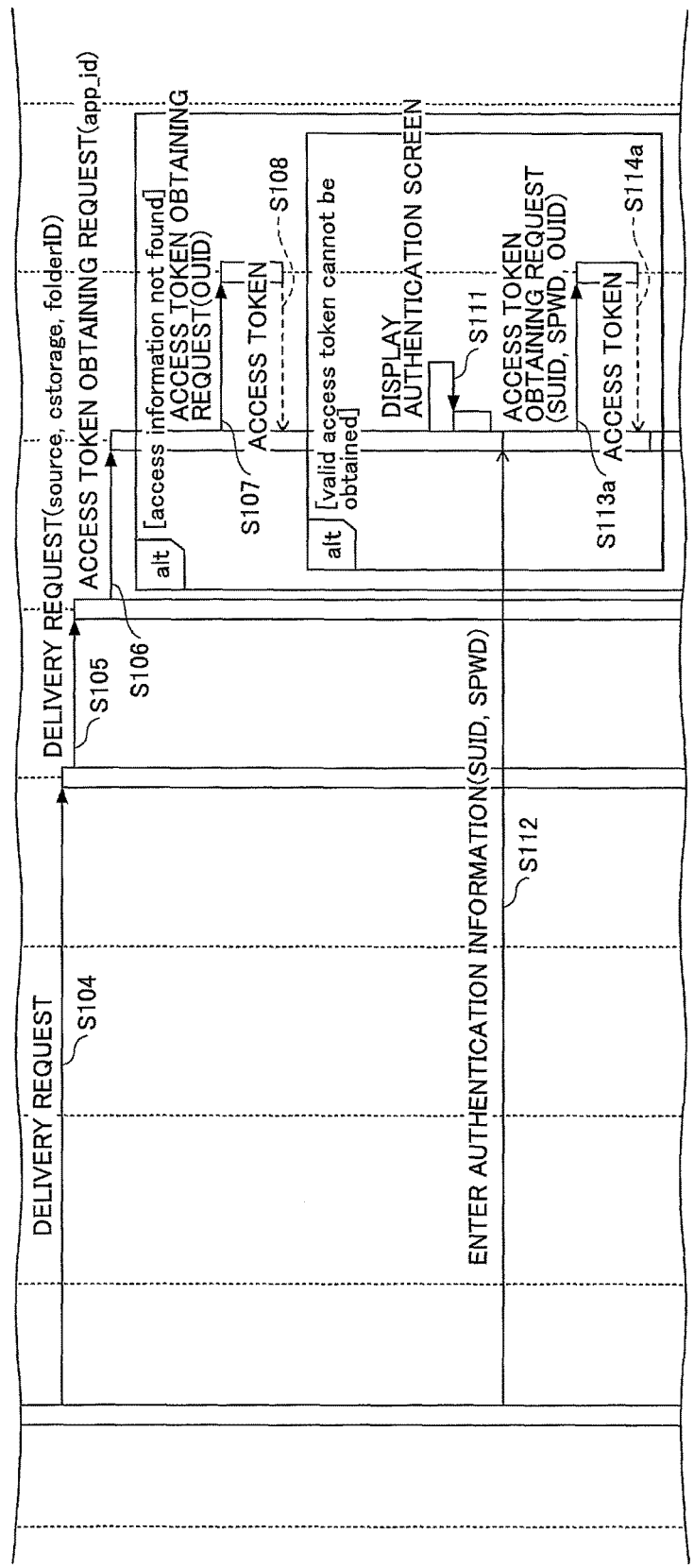
FIG. 14B is a sequence diagram illustrating an example of a flow of a process performed in an information processing system according to a fourth embodiment.
Figure 14C:
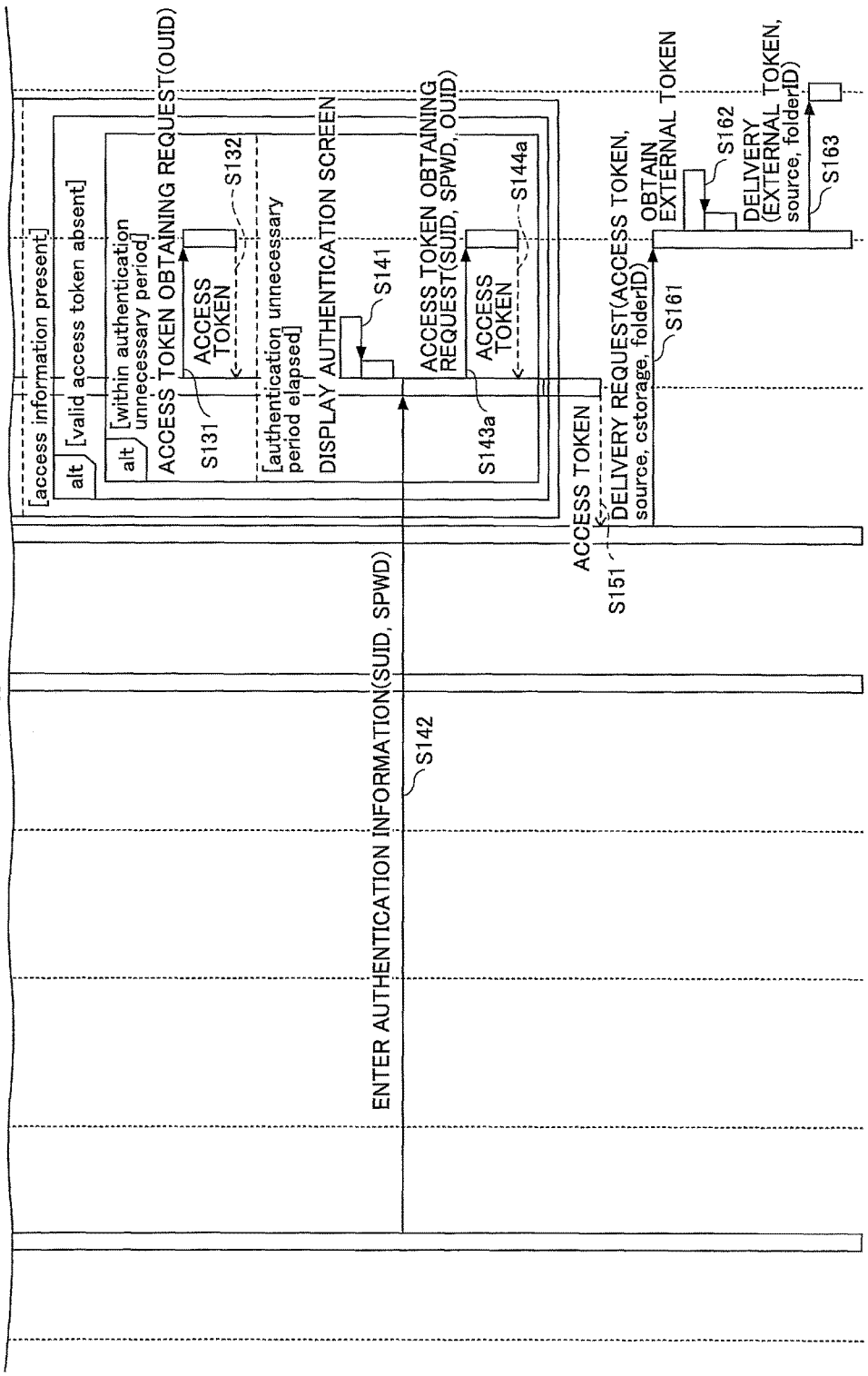
FIG. 14C is a sequence diagram illustrating an example of a flow of a process performed in an information processing system according to a fourth embodiment.

FIGS. 14A to 14C are a set of sequence diagrams illustrating an example of a flow of a process performed in the information processing system according to the fourth embodiment.

In the fourth embodiment, performed at steps S401 through S405 are processes in accordance with operations of an administrator using one of the imaging devices 10 in the user environment E1.

When the administrator enters an instruction to display a user information setting screen at step S401, the authentication coordination module 126 displays the user information setting screen on the operation panel 15 (S402). Next, when the administrator enters setting information of a certain user (hereinafter, the certain user is referred to as "user A"), such as an SUID, an SPWD, an QUID, and limitation information (S403), the authentication coordination module 126 issues a registration request of the entered setting information to the authentication service module 22 in the service providing apparatus 20 (S404). The authentication service module 22 stores the setting information into the user information storage unit 23 (S405). Note that the user ID managed by the external authentication server 50 is used as the QUID in the setting information. Further, the limitation information is used for limiting access sources (devices or apparatus) accessible to the service providing apparatus 20 using the QUID. In the present embodiment, IP address range is used as the limitation information.

FIG. 15 is a diagram illustrating an example of a configuration of the user information storage unit 23 according to the fourth embodiment. As illustrated in FIG. 15, the user information storage unit 23 can store the limitation information for each SUID. In FIG. 15, though "xxx.xxx.xxx.*" is illustrated as the limitation information of a user having an SUID "suser1", an actual network address is recorded in a portion of "xxx.xxx.xxx". That is, FIG. 15** illustrates an example in which access sources are limited based on a network address.

After the above described settings were performed by the administrator, each user starts using the AP 121a.

Steps S301 and thereafter illustrate a flow of a process performed when, for example, user A uses the AP 121a. The flow of the process is basically the same as the flow illustrated in FIGS. 13A to 13C. However, even when user A uses the imaging device 10 (hereinafter, the imaging device 10 to be used by user A will be referred to as an "imaging device 10a") for the first time, user A needs not enter his/her SUID and SPWD. This is because an QUID included in an access token obtaining request issued at step S107, which corresponds to a user ID of user A, is already stored in the user information storage unit 23 at a time when step S107 is executed. Therefore, an access token is returned when step S108 is executed.

Similarly, when user A uses an AP 121 on another imaging device (hereinafter referred to as an "imaging device 10*b*"), user A needs not enter his/her SUID and SPWD. That is, even when user A uses the imaging device 10*b*, the user ID (that is, an OUID) notified of the authentication coordination module 126 is the same as the user ID when user A uses the imaging device 10*a*. Accordingly, in response to the access token obtaining request issued at step S107, the access token, which is the same as that when the imaging device 10*a* is used, is returned. Therefore, also in this case, user A needs not enter his/her SUID and SPWD. However, if the access token received at step S108 has expired, user A should enter his/her SUID and SPWD at step S112.

At step S113*a*, S131, or S143*a* in FIGS. 14A to 14C, the authentication service module 22 determines whether access is allowed or not, based on the limitation information corresponding to the OUID included in the request of these steps. For example, the authentication service module 22 determines whether an IP address of the device/apparatus, from which the request is issued, is within a range specified with the limitation information corresponding to the OUID stored in the user information storage unit 23. If the IP address is not within the range, the authentication service module 22 does not return an access token. By performing the process described here, the information processing system 1 according to the fourth embodiment can limit imaging devices 10 which can access the service providing apparatus 20 to, for example, the imaging devices 10 within the user environment E1.

In the above description, an example in which the limitation information is an IP address range is described. However, an APP-ID may be used as the limitation information, similar to the allow list or the deny list in the access information storage unit 132 (FIG. 7). If an APP-ID is used as the limitation information, an APP-ID of an AP 121 issuing a delivery request at step S105 may also be sent to the authentication service module 22 at step S113*a*, S131, or S143*a*.

Further in the above description, an example in which steps S401 through S405 are executed in advance, in accordance with operations of the administrator is described. However, similar to the first through third embodiments, an QUID may not be stored in the user information storage unit 23 in advance.

In this case, when user A uses a first imaging device 10 (for example, the imaging device 10*a*), because an access token cannot be obtained at step S108 in FIG. 143, a set of an SUID and an SPWD must be entered at step S112. However, when user A uses the imaging device 10*a* or the imaging device 10*b* thereafter, user A needs not enter his/her SUID and SPWD if the access token has not expired or if the authentication unnecessary period has not passed.

As described above, according to the third or the fourth embodiment, under an environment where multiple imaging devices 10 are used, a common QUID is used for accessing each imaging device 10. Accordingly, operation burdens (input of an SUID and SPWD) by users can be reduced.

Further, because each QUID can be associated with limitation information, the information processing system 1 can prevent a range of imaging devices 10, which can access the service providing apparatus 20 without requiring an input of an SUID and an SPWD, from expanding indefinitely.

Next, a fifth embodiment will be described. In the fifth embodiment, differences from the first embodiment will be described. Accordingly, what is not described in the fifth embodiment may be the same as that described in the first embodiment.

When a certain user (user A) tries to deliver data to a folder of user B, an error occurs if user A has no privilege to access the folder. In the fifth embodiment, such a case will be described. Also, the fifth embodiment describes an example of a method of completing the delivery successfully without increasing operation burdens by users.

Figure 16:
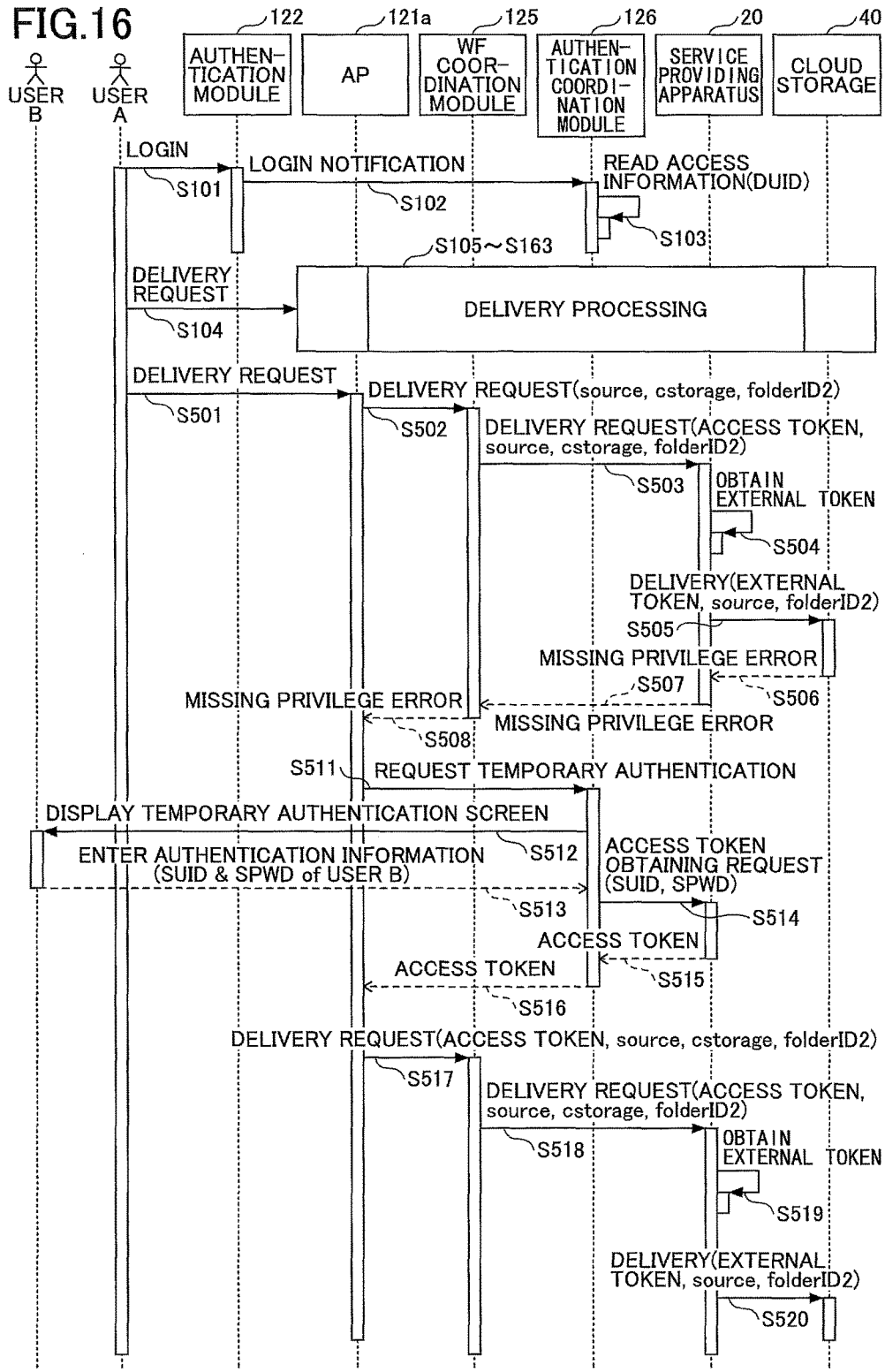
FIG. 16 is a sequence diagram illustrating an example of a flow of a process performed in an information processing system according to a fifth embodiment.

FIG. 16 is a sequence diagram illustrating an example of a flow of a process performed in the information processing system according to the fifth embodiment. With respect to a step in FIG. 16 equivalent (or similar) to the step in FIGS. 5A to 5B, the same reference number is attached and the description about the step will be omitted.

Suppose that user A is an operator of the imaging device 10 in FIG. 16. Also suppose the case in which, similar to FIGS. 5A to 5B, steps S101 through S163 are executed normally in accordance with operations of user A, and data is delivered to a folder of user A.

Next, user A continues to use the AP 121*a*, and issues a request to deliver data by designating identification information of data to be delivered (source), identification information of the cloud storage 40 where data is to be delivered (cstorage), and a folder ID of a folder where data is to be delivered (folderID2) (S501). Here, suppose that user B has privilege to access folderID2 but that user A does not have privilege to access folderID2. The AP 121*a* enters a delivery request, including the source, the cstorage, and the folderID2, to the WF coordination module 125 (S502). The delivery request is entered using the unified API.

Next, similar to step S161, the WF coordination module 125 issues a delivery request to the WF service module 21 in the service providing apparatus 20 (S503). The delivery request at least includes the access token obtained by processing the delivery request at step S104, the source, the cstorage, and the folderID2 designated with the delivery request received at step S502.

When the WF service module 21 receives the delivery request, the WF service module 21 executes a process similar to step S162 to obtain an external token associated with user A from the user information storage unit 23 (FIG. 9) (S504). Next, the WF service module 21 delivers (uploads) the data to be delivered into the folder where the data is to be delivered in the cloud storage 40 where the data is to be delivered (S505). When the delivery is performed, the access token obtained at step S504 is designated. However, because user A corresponding to the access token has no access privilege to access the folder where the data is to be delivered (folderID2), the cloud storage 40 rejects the delivery (upload) and returns an error (hereinafter referred to as a "missing privilege error") indicating that a requester does not have access privilege (S506). The missing privilege error is returned to the AP 121*a* via the WF coordination module 125 (S507, S508).

In response to receiving the missing privilege error, the AP 121*a* requests the authentication coordination module 126 to authenticate another user to allow the another user to log in temporarily (S511). Hereinafter, the authentication is referred to as "temporary authentication". When the request is received, the authentication coordination module 126 displays a temporary authentication screen on the operation panel 15 (S512). A configuration of the temporary authentication screen may be the same as that of the authentication screen 510 in FIG. 8. Alternatively, the temporary authentication screen may display a message denoting that a current user has no access right to access the folder where data is to be delivered, and a message to encourage a user having access right to login.

When the temporary authentication screen is displayed, user A asks of user B to go to the imaging device 10, and requests user B to enter authentication information (a set of an SUID and an SPWD of user B). In accordance with the request, user B enters his/her SUID and SPWD using the temporary authentication screen (S513). Subsequently, the authentication coordination module 126 issues an access token obtaining request to the authentication service module 22 in the service providing apparatus (S514). The request includes a set of the SUID and the SPWD of user B entered using the temporary authentication screen.

The authentication service module 22 authenticates with the SUID and the SPWD included in the request. When the authentication has succeeded, the authentication service module 22 generates an access token based on the SUID and the like, and returns the access token (S515). The authentication coordination module 126 returns the access token to the AP 121a (S516).

The AP 121a enters a delivery request, including the source, the cstorage, and the folderID2, to the WF coordination module 125 (S517). The delivery request is entered using the unified API. Similar to step S161, the WF coordination module 125 issues a delivery request to the WF service module 21 in the service providing apparatus 20 (S518). The delivery request at least includes the access token of user B, the source, the cstorage, and the folderID2.

When the WF service module 21 receives the delivery request, the WF service module 21 obtains an external token associated with user B from the user information storage unit 23 (FIG. 9), by performing a process similar to step S162 in FIG. 5B (S519). Next, the WF service module 21 delivers (uploads) the data to be delivered into the folder where the data is to be delivered in the cloud storage 40 where the data is to be delivered (S520). When delivering (uploading) the data, the external token obtained at step S519 is used. Because user B corresponding to the external token has privilege to access the folder where the data is to be delivered (folderID2), the cloud storage 40 allows the delivery (upload).

Even when the temporary authentication was performed, the target access information stored in the RAM 112 by the authentication coordination module 126 is the access information associated with user A. Accordingly, after the temporary authentication, if a request is issued from any APs 121 to the WF coordination module 125, processes corresponding to the request are performed by referring to the target access information associated with user A.

That is, a login state of user B is effective only in one call for the unified API.

As described above, according to the fifth embodiment, user A can ask of user B to login temporarily and can perform delivery by using an access right of user B, without a logout operation of user A. Hence, user B need not perform logout operation, and user A can continue subsequent operations without performing login again. Accordingly, operation burdens to users can be reduced.

Further, any combinations of the above embodiments may be practiced.

Further, the above embodiments may be applied to a case in which an AP 121 installed in the imaging device 10 coordinates with services other than the cloud storage 40.

Further, types of a program to which the above embodiments can be applied are not limited to a specific one. For example, the AP 121 according to the above embodiments may not only be a program providing a GUI (Graphical User Interface), but also a server-type program not providing a GUI.

Further, the above embodiments may be applied to devices other than the imaging device 10. For example, devices such as a projector, an electronic whiteboard, and a teleconference system, may have the functional configuration similar to that of the imaging device 10 illustrated in FIG. 4. In this case, a hardware configuration of the device may be different from the hardware configuration illustrated in FIG. 3 (for example, the scanner 12 or the printer 13 may not be necessary). However, each device should include components equivalent to the operation panel 15, the controller 11, and the network interface 16 illustrated in FIG. 3, as well as hardware elements specific to each device (for example, if the device is a projector, the device may include a projecting device including projector lens as a hardware element, and if the device is an electronic whiteboard, the device may include a touchscreen).

Note that, in the above embodiments, the imaging device 10 is just an example of an apparatus. The service providing apparatus 20 is an example of an information processing apparatus. The cloud storage 40 is an example of an external device. The unified API is an example of a unified interface.

The authentication coordination module 126 is an example of a first identifying unit or an acquisition unit. The QUID is an example of user identification information. The AP 121 is an example of a first program. The access token is an example of first data. The access information storage unit 132 is an example of a first storage unit. The authentication service module 22 is an example of a first transmitting unit. The user information storage unit 23 is an example of a second storage unit. The authentication module 122 is an example of a second identifying unit. The WF coordination module 125 is an example of a second transmitting unit. The authentication unnecessary period is an example of a given period.

The information processing system, the information processing method, and the information processing apparatus are not limited to the specific embodiments described above, and variations and enhancements may be applied within the scope of the subject matters described in the claims.

It should be noted that a person skilled in the field of information processing technology may employ the present invention using an application specific integrated circuit (ASIC) or an apparatus in which circuit modules are connected. Further, each of the functions (function units) may be implemented by one or more circuits. It should be noted that, in this specification, the circuit may include a processor programmed by software to execute the corresponding functions and hardware which is designed to execute the corresponding functions such as the ASIC and the circuit module.

What is claimed is:

1. An information processing system comprising an information processing apparatus coupled to an external device via a network, and an apparatus coupled to the information processing apparatus;

the information processing apparatus including a memory storing a program and a processor configured to execute the program to implement a first process including performing authentication using authentication information provided by the apparatus, transmitting to the apparatus first data denoting that the authentication has been made by the information processing apparatus, in response to success of the authentication, receiving, from the apparatus, an access request for accessing the external device with the first data, and performing an access to the external device, in response to receiving the access request with the first data, in a case in which the first data is valid;

the apparatus including a memory storing a program and a processor configured to execute the program to implement a second process including identifying user identification information of an operator of the apparatus, receiving the access request for accessing the external device from the operator, requesting, in response to receiving the access request, the operator to input the authentication information for the information processing apparatus, sending the authentication information input by the operator to the information processing apparatus, obtaining the first data from the information processing apparatus, storing the first data into a first storage unit by correlating with the user identification information, and issuing the access request for accessing the external device with the first data, to the information processing apparatus;

wherein the requesting for the input of the authentication information of the operator is waived when the first data correlated with the identified user identification information is stored in the first storage unit.

2. The information processing system according to claim 1, the second process further comprising transmitting the user identification information to the information processing apparatus in response to obtaining the first data, and the first process further comprising storing the user identification information received from the apparatus in correlation with the first data into a second storage unit.

3. The information processing system according to claim 2, the second process further comprising transmitting a request for obtaining the first data, with the identified user identification information, to the information processing apparatus waiving request of the operator to input the authentication information when conditions a) and b) are satisfied:

a) the identified user identification information is stored in the first storage unit, b) the first data associated with the user identification information stored in the first storage unit has expired but a predetermined period has not been passed; and the first process further comprising, in response to receiving the request for obtaining the first data, sending to the apparatus the first data stored in the second storage unit associated with the user identification information included in the request.

4. The information processing system according to claim 1, the second process further comprising transmitting a request for obtaining the first data, with the user identification information, to the information processing apparatus waiving request of the operator to input the authentication information; and the first process further comprising, in response to receiving the request for obtaining the first data, sending to the apparatus the first data stored in a second storage unit associated with a user identification information for another apparatus, the user identification information for the another apparatus being equivalent to the user identification information included in the request.

5. The information processing system according to claim 1, the second process further comprising transmitting an access request for accessing the external device to the information processing apparatus, with the first data corresponding to a first operator stored in the first storage unit, and requesting a second operator to input authentication information for the information processing apparatus, in response to receiving a denial of the transmitted access request.

6. An apparatus coupled to an information processing apparatus, the information processing apparatus being coupled to an external device via a network and including a memory storing a program and a processor configured to execute the program to implement a first process, the first process including performing authentication using authentication information provided by the apparatus, transmitting to the apparatus first data denoting that the authentication has been made by the information processing apparatus, in response to success of the authentication, receiving, from the apparatus, an access request for accessing the external device with the first data, and performing an access to the external device, in response to receiving the access request with the first data, in a case in which the first data is valid, the apparatus comprising a memory storing a program and a processor configured to execute the program to implement a second process including:

identifying user identification information of an operator of the apparatus, and receiving the access request for accessing the external device from the operator, requesting, in response to receiving the access request, the operator to input the authentication information for the information processing apparatus, sending the authentication information input by the operator to the information processing apparatus, obtaining the first data from the information processing apparatus, and storing the first data into a first storage unit by correlating with the user identification information, and issuing the access request for accessing the external device with the first data, to the information processing apparatus;

wherein the requesting for the input of the authentication information of the operator is waived when the first data correlated with the identified user identification information is stored in the first storage unit.

7. The apparatus according to claim 6, the second process further comprising transmitting the user identification information to the information processing apparatus in response to obtaining the first data, to cause the information processing apparatus to store the user identification information received from the apparatus in correlation with the first data into a second storage unit.

8. The apparatus according to claim 7, the second process further comprising transmitting a request for obtaining the first data, with the identified user identification information, to the information processing apparatus waiving request of the operator to input the authentication information when conditions a) and b) are satisfied:

a) the identified user identification information is stored in the first storage unit, b) the first data associated with the user identification information stored in the first storage unit has expired but a predetermined period has not been passed; and the first process further comprising, in response to receiving the request for obtaining the first data, sending to the apparatus the first data stored in the second storage unit associated with the user identification information included in the request.

9. The apparatus according to claim 6,
the second process further comprising transmitting a request for obtaining the first data, with the user identification information, to the information processing apparatus waiving request of the operator to input the authentication information; and
the first process further comprising, in response to receiving the request for obtaining the first data, sending to the apparatus the first data stored in a second storage unit associated with a user identification information for another apparatus, the user identification information for the another apparatus being equivalent to the user identification information included in the request.

10. The apparatus according to claim 6, the second process further comprising transmitting an access request for accessing the external device to the information processing apparatus, with the first data corresponding to a first operator stored in the first storage unit, and
requesting a second operator to input authentication information for the information processing apparatus, in response to receiving a denial of the transmitted access request.

11. An information processing method performed by an apparatus and an information processing apparatus coupled to the apparatus, the information processing apparatus being connected to an external device via a network, the method comprising:
identifying, by the apparatus, user identification information of an operator of the apparatus;
receiving, by the apparatus, an access request for accessing the external device from the operator;
requesting, in response to receiving the access request, the operator to input authentication information for the information processing apparatus;
sending the authentication information input by the operator to the information processing apparatus;
performing, by the information processing apparatus, authentication with the authentication information received from the apparatus;
transmitting, in response to success of the authentication, first data denoting that the authentication has been made, from the information processing apparatus to the apparatus;
obtaining, by the apparatus, the first data from the information processing apparatus,
storing the first data into a first storage unit by correlating with the user identification information;
issuing, from the apparatus to the information processing apparatus, the access request for accessing the external device with the first data; and
performing, by the information processing apparatus, an access to the external device, in response to receiving the access request with the first data, in a case in which the first data is valid;

wherein the requesting for the input of the authentication information is waived when the first data correlated with the identified user identification information is stored in the first storage unit.

12. The information processing method according to claim 11, further comprising:
transmitting the user identification information from the apparatus to the information processing apparatus in response to obtaining the first data; and
storing, by the information processing apparatus, the user identification information received from the apparatus in correlation with the first data into a second storage unit.

13. The information processing method according to claim 12, further comprising:
transmitting, from the apparatus to the information processing apparatus, a request for obtaining the first data with the identified user identification information, waiving request of the operator to input the authentication information when conditions a) and b) are satisfied:
a) the identified user identification information of the operator is stored in the first storage unit,
b) the first data associated with the user identification information stored in the first storage unit has expired but a predetermined period has not been passed; and
sending, from the information processing apparatus to the apparatus, the first data stored in the second storage unit associated with the user identification information included in the request, in response to receiving the request for obtaining the first data.

14. The information processing method according to claim 11, further comprising:
transmitting, from the apparatus to the information processing apparatus, a request for obtaining the first data with the user identification information, waiving request of the operator to input the authentication information; and
sending, from the information processing apparatus to the apparatus, in response to receiving the request for obtaining the first data, the first data stored in a second storage unit associated with a user identification information for another apparatus, the user identification information for the another apparatus being equivalent to the user identification information included in the request.

15. The information processing method according to claim 11, further comprising:
transmitting, from the apparatus to the information processing apparatus, an access request for accessing the external device with the first data corresponding to a first operator stored in the first storage unit; and
requesting a second operator to input authentication information for the information processing apparatus, in response to receiving a denial of the transmitted process access request.

* * * * *